(12) United States Patent
Norwalk et al.

(10) Patent No.: US 11,467,676 B2
(45) Date of Patent: *Oct. 11, 2022

(54) COMPUTER KEYBOARD WITH ELECTRONICALLY CHANGEABLE KEYCAPS

(71) Applicant: Key Ovation, LLC, Cedar Park, TX (US)

(72) Inventors: Mark Norwalk, Austin, TX (US); Chris Linegar, Sydney (AU)

(73) Assignee: Key Ovation, LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,700

(22) Filed: Feb. 8, 2021

(65) Prior Publication Data

US 2021/0247850 A1 Aug. 12, 2021

Related U.S. Application Data

(60) Provisional application No. 62/970,757, filed on Feb. 6, 2020.

(51) Int. Cl.
| | | |
|---|---|---|
| *G06F 3/02* | (2006.01) | |
| *G06F 3/023* | (2006.01) | |
| *G06F 3/038* | (2013.01) | |
| *H01H 13/83* | (2006.01) | |

(52) U.S. Cl.
CPC ............ *G06F 3/0219* (2013.01); *G06F 3/021* (2013.01); *G06F 3/0238* (2013.01); *G06F 3/038* (2013.01); *H01H 13/83* (2013.01); *H01H 2231/002* (2013.01)

(58) Field of Classification Search
CPC .... G06F 3/0238; G06F 3/0202; G06F 1/1662; G06F 3/0219; G06F 3/021; G06F 3/038; H03K 17/9622; H03K 17/969; H03K 17/98; H03K 2217/94104; H01H 2219/039; H01H 13/702; H01H 13/704; H01H 13/85; H01H 2219/016; H01H 2221/044; H01H 2215/004; H01H 2215/05

See application file for complete search history.

(56) References Cited

U.S. PATENT DOCUMENTS

| | | | | |
|---|---|---|---|---|
| 5,164,723 A | * | 11/1992 | Nebenzahl | ............ G06F 3/0238 341/23 |
| 5,952,680 A | * | 9/1999 | Strife | ..................... H01L 27/156 257/88 |
| 2005/0018316 A1 | * | 1/2005 | Curtis | ....................... G02B 3/00 359/718 |
| 2007/0065215 A1 | * | 3/2007 | Brown | ................... H01H 13/83 400/490 |
| 2008/0131184 A1 | * | 6/2008 | Brown | .................. G06F 3/0238 400/490 |
| 2012/0068934 A1 | * | 3/2012 | Larsen | .................. G06F 3/0202 345/168 |
| 2013/0114147 A1 | * | 5/2013 | Stark | ...................... G02B 13/06 359/664 |
| 2014/0002366 A1 | * | 1/2014 | Gluckstad | ............. G06F 3/0202 345/168 |
| 2018/0052527 A1 | * | 2/2018 | Serra-Martin | ........ G06F 3/0238 |
| 2019/0137752 A1 | * | 5/2019 | Shaffer | .............. G02B 21/0076 |

\* cited by examiner

*Primary Examiner* — Hong Zhou
(74) *Attorney, Agent, or Firm* — Dykema Gossett PLLC

(57) ABSTRACT

Aspects of the present disclosure are directed to systems, apparatuses, and methods for the projection of images onto keycaps of a computer keyboard.

11 Claims, 20 Drawing Sheets

COMPUTER KEYBOARD WITH ELECTRONICALLY CHANGEABLE KEYCAPS

CROSS-REFERENCE TO RELATED APPLICATIONS

This application claims the benefit of U.S. provisional application No. 62/970,757, filed 6 Feb. 2020, which is hereby incorporated by reference as though fully set forth herein.

This application is related to U.S. provisional application No. 62/345,673, filed 3 Jun. 2016; U.S. provisional application No. 62/455,705, filed 7 Feb. 2017; and U.S. application Ser. No. 15/611,223, filed 1 Jun. 2017, all of which are hereby incorporated by reference as though fully set forth herein.

BACKGROUND a. Field

The instant disclosure relates to keyboards. In one embodiment, the instant disclosure relates to electronic keyboards for use as an input device for a computer.

b. Background Art

The standard data entry keyboard used to input data into a computer is based on the "QWERTY" layout developed over 100 years ago for the manual typewriter. The alphabetic keys, numeric keys and most punctuation keys are laid out essentially the same as they were over 100 years ago. This layout has no particular logic to it in terms of the sequence of the keys other than to keep the keys from jamming due to interfering keys being consecutively struck too quickly. This was useful in the days of mechanical typewriters which depended on levers causing arms with letters forged on them to swing up from their resting positions and strike an inked ribbon against the typing paper.

Modern keyboards, which are often used as data input devices for computers, may be reconfigured to input various types of data including different languages and may act as "hot keys" to initiate pre-programmed commands in a program or an application.

The foregoing discussion is intended only to illustrate the present field and should not be taken as a disavowal of claim scope.

BRIEF SUMMARY

Aspects of the present disclosure are believed to be applicable to a variety of different types of data entry devices, including computer keyboards, electronic typewriters, other data entry units, and other similar apparatus. Specific embodiments are believed to be particularly beneficial to computers for switching among various standard keyboard layouts and custom keyboard layouts for standard and/or specialty keys or key combinations, including various language-specific characters, or for inputting various types of data and commands, including numeric and alphanumeric characters, various program specific commands, and hot key type commands using a single physical keyboard.

In one embodiment, an apparatus includes an electronic keyboard and an image processing means. The electronic keyboard detects a user input, and includes one or more keys and an electro-mechanical interface. Each of the one or more keys includes a keycap, and mechanically interfaces with a user when a specific data input associated with the key is desired. The electro-mechanical interface is coupled to the one or more keys and, in response to the mechanical interaction between the user and the one or more keys, converts the mechanical interaction into an electrical signal indicative of the specific data input. The image projecting means is coupled to the electronic keyboard (or contained therein) and projects an image onto a top surface of the one or more keycaps via an optical element.

In another embodiment, an apparatus includes an electronic keyboard and an image projecting means. In this embodiment, the electronic keyboard includes one or more keys, and detects user inputs on the one or more keys and associates the user inputs with specific data inputs. The image projecting means is coupled to the electronic keyboard, and projects an image onto a surface of the one or more keycaps of the electronic keyboard via an optical element.

The foregoing and other aspects, features, details, utilities, and advantages of the present disclosure will be apparent from reading the following description and claims, and from reviewing the accompanying drawings.

BRIEF DESCRIPTION OF THE DRAWINGS

Various example embodiments may be more completely understood in consideration of the following detailed description in connection with the accompanying drawings, in which.

Figure 1:
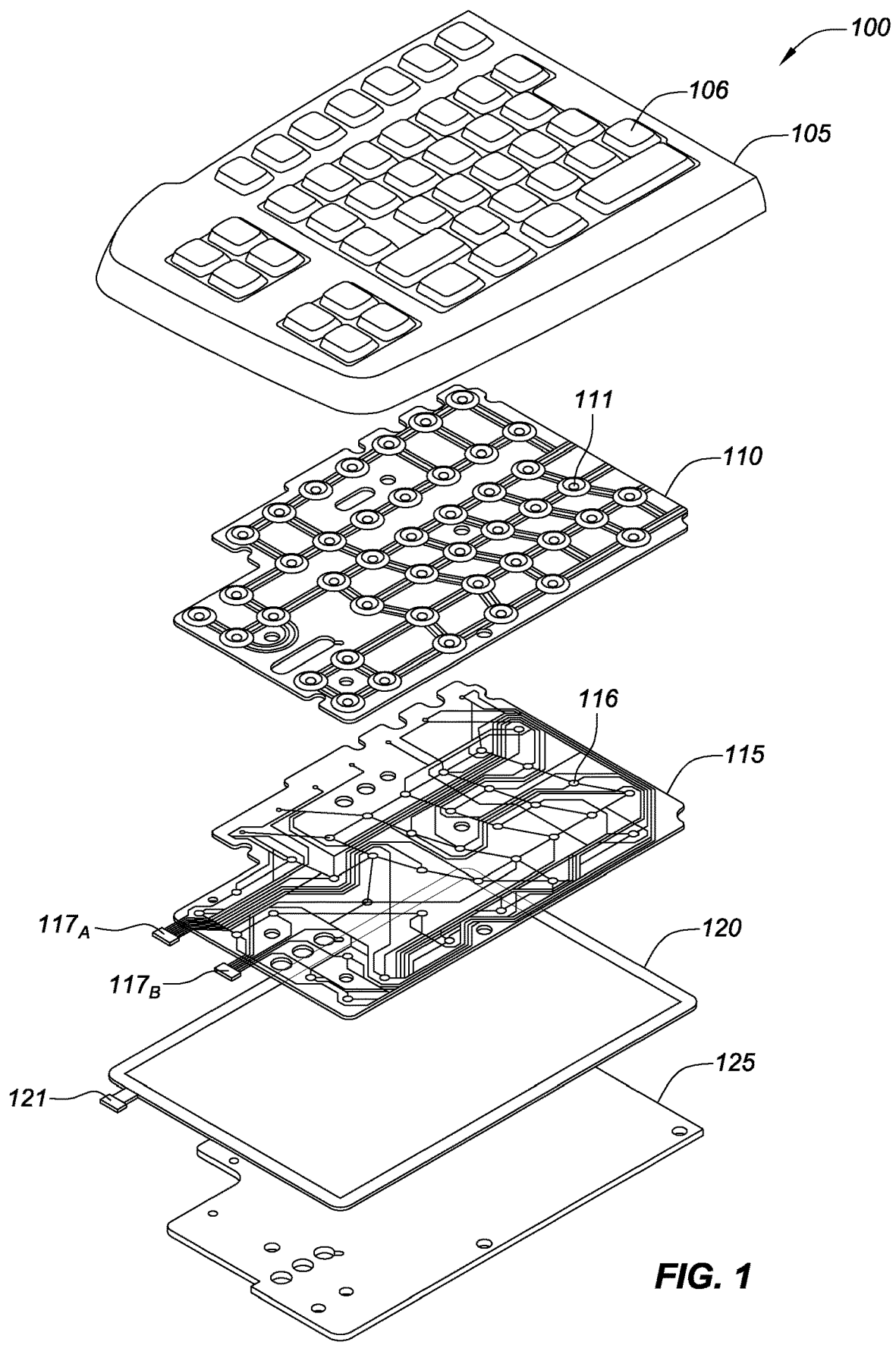
FIG. 1 is an exploded isometric view of a computer keyboard, consistent with various aspects of the present disclosure.

Various embodiments discussed herein are amenable to modifications and alternative forms, and aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION OF EMBODIMENTS

Aspects of the present disclosure are believed to be applicable to a variety of different types of data entry devices, including computer keyboards, electronic typewriters, other data entry units, and other similar apparatus. Specific embodiments are believed to be particularly beneficial to computers for switching among various standard keyboard layouts and custom keyboard layouts for standard and/or specialty keys or key combinations, including various language-specific characters, or for inputting various types of data and commands, including numeric and alphanumeric characters, various program specific commands, and hot key type commands using a single physical keyboard.

Various embodiments of the present disclosure are presented by way of the illustrations in the figures. FIG. 1 is an exploded isometric view of a computer keyboard 100, consistent with various aspects of the present disclosure. The basic computer keyboard 100 includes a key matrix 115 releasably coupled to a silicon membrane 110. Adjacent the key matrix 115, silicon membrane 110 is releasably coupled to keys 106 that are housed in an upper housing 105. Opposite the upper housing 105, a lower housing 125 in conjunction with the upper housing encloses the keyboard components. When the key 106 is manipulated by a user, the key longitudinally moves (e.g., moves vertically downward) into or toward the housing and contacts a paired dome 111 of the membrane 110. In some embodiments the membrane 110 may include silicone or a composition including silicone, or some other deformable-type material that facilitates returning a key to its initial position after a key press. As the key moves longitudinally, the dome 111 is deformed into contact with an electrical contact switch 116 associated with the pressed key 106, thereby activating the contact switch. The key matrix 115, membrane 110, and the one or more keys 106 are collectively referred to herein as an electromechanical interface. When communicatively coupled to a computer system, the keyboard 100 transmits a key code in response to the activation of the contact switch 116 to the computer system (by way of one or more electrical connectors 117A and/or 117B). The key code, once received by the computer system, is associated with a specific data input based on a selected keyboard layout.

As further shown in FIG. 1, an image projecting means 120 (e.g., a light emitting diode ("LED") display, a liquid crystal ("LCD") display, a projector such as a digital laser projector, cathode ray tube, digital display, fiber optic display, or other light illumination means) is positioned underneath key matrix 115, relative to the one or more keys 106. Consistent with various embodiments of the present disclosure, the image projecting means 120 projects one or more images up through either transparent portions of the key matrix 115 and silicon membrane 110, or through apertures therein, and onto a surface of the one or more keys. In more specific embodiments, at least a portion of the one or more keys are transparent to allow the image to be projected up through the key and onto a top surface of the key (a top portion of the key known as a keycap) for viewing by a user. The image projected onto the surface of each keycap thus being dynamically changeable by the user and/or operating system. Note that, although the image is shown in the figures as being projected onto the top surface of the keycap, the image could be projected onto one or more of the side surfaces of the keycap, or onto both the top surface and one or more of the side surfaces of the keycap.

In one exemplary embodiment of the present disclosure, image projecting means 120 projects an image onto key 106 indicative of the data input associated with the key, and in response to a control signal received by the image projecting means 120 via electrical connector 121. The image projecting means facilitates a maintained association between a key's visually indicated data input and the operating system assigned data input. In further specific embodiments, in response to a keyboard layout change at a computer system level, on-board keyboard circuitry updates the projected images on each of the one or more keys to reflect the updated association between each key and its assigned data input. In such an embodiment, an operating system of the communicatively coupled computer system may include software that enables the automatic reconfiguration of the projected images on each of the one or more keys based on the selected keyboard layout. In yet further embodiments, the computer system may also include editor software that enables a user to customize the projected keyboard layout, font, size, color, among other customizable characteristics based on the user's preference on the computer system. The user may then apply, save, and share the custom keyboard layout and associated images as a re-useable keyboard layout in the computer operating system environment.

Figure 2:
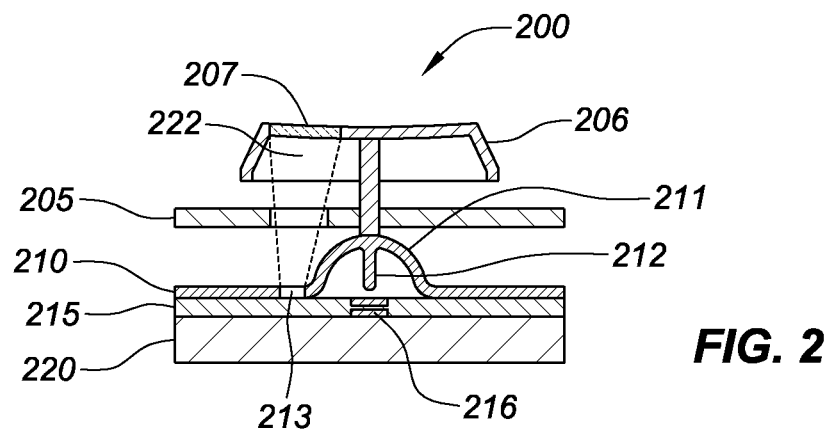
FIG. 2 is a partial cross-sectional side view of a computer keyboard, consistent with various aspects of the present disclosure.

FIG. 2 is a partial cross-sectional side view of a computer keyboard 200, consistent with various aspects of the present disclosure. Specifically, FIG. 2 illustrates a partial cross-section of a dome-switch type keyboard 200. To enter data, a user selects a desired key 206 based on an image 222 projected (via an image projecting means 220) through a transparent portion 207 of the key. The image projected on the key may be indicative of the data input associated with the key 206 of the keyboard 200. When a user selects the key 206, the key vertically extends into contact with dome 211 which deforms in response to the force exerted by the user through the key. The deformation of the dome 211 extends contact facilitating protrusion 212 vertically into contact with a first portion of contact switch 216. When a sufficient amount of force is induced on the key 206 by the user, the resulting displacement on the first potion of the contact switch 216 places the first portion of the contact switch into contact with a second portion (below the first) to complete an electrical circuit. When communicatively coupled to a computer, the closed electrical circuit transmits a specific key code indicative of the key pressed by the user which is associated at the operating system level with a specific data input based on a selected keyboard layout. It is to be understood that aspects of the present disclosure are amenable to various other types of keyboard configurations and types, such as membrane-type keyboards, scissor-switch type keyboards, capacitive keyboards, mechanical-switch type keyboards, buckling-spring type keyboards, hall-effect keyboards, laser projection keyboards, optical-keyboards, roll-up keyboards (e.g., including flexible circuits including materials such as polyimide, PEEK, transparent conductive polyester film, and bendable glass), among others.

As shown in FIG. 2, a display 220 (one type of image projecting means) projects an image 222 up through a transparent key matrix 215 (near a contact switch 216), an aperture 213 through a membrane 210, and an opening in an upper housing 205. The image 222 travels through a transparent portion 207 of key 206, and is displayed on a top surface of the key. In further more specific embodiments, the transparent portions (e.g., key matrix 215), and apertures within the membrane and upper housing may be utilized to achieve one or more of the following optical adjustments: refraction, diffraction, and reflection. Such optical adjustments may be used to, for example, focus, enhance, expand, or direct the transmission or the transmission path of the image 222 or the image itself in a desired way. As one example, where it is desirable to expand the size of the image displayed on the key 206, the optical properties of the key matrix 215 may be tuned, or a lens may be installed within one or more of the apertures to expand the image. Where limiting the size of the projected image to a small portion of the key 206 is desirable, an aperture may be minimized or axially offset to decrease the amount of light and/or the area in which the light is transmitted into contact with a surface of the keycap.

Figure 3:
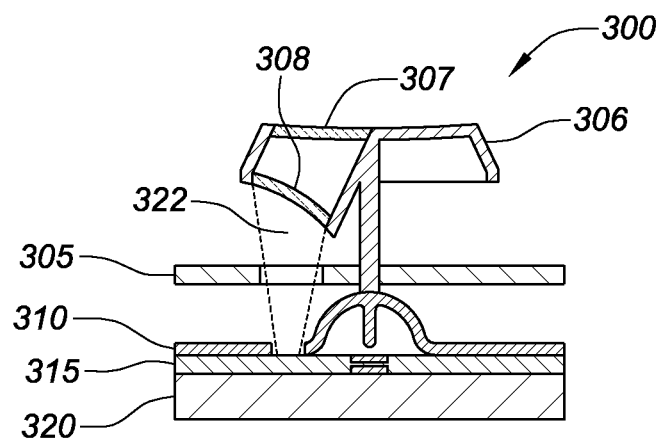
FIG. 3 is a partial cross-sectional side view of a computer keyboard, consistent with various aspects of the present disclosure.

FIG. 3 is a partial cross-sectional side view of a computer keyboard 300, consistent with various aspects of the present disclosure. In the present embodiment, to increase the amount of surface area of the key 306 displaying an image 322, a lens 308 (or other light manipulating means) redirects and expands the image light column to further center the image on the keycap. The image 322 is projected from an image projecting means 320 through a key matrix 315 (e.g., through a transparent portion or an aperture therein), and a membrane 310 (e.g., through a transparent portion or an aperture therein). In various embodiments of the present disclosure, the apertures and/or transparent portions of the key matrix 315 and the membrane 310 may be utilized in conjunction with, or in substitution of the lens 308 to provide the desired optical corrections.

In other simplified embodiments, or where retro-fit of existing keyboards may be desirable, the image projecting means 320 may be coupled to a top surface of the upper housing 305 and the image 322 projected directly through the transparent portion 307 of the key and displayed on a top surface or other surface of the key. In such an embodiment, re-engineering of the existing keyboard to include apertures or optically transparent portions in key matrix 315, membrane 310, or upper housing 305, is unnecessary.

Figure 4:
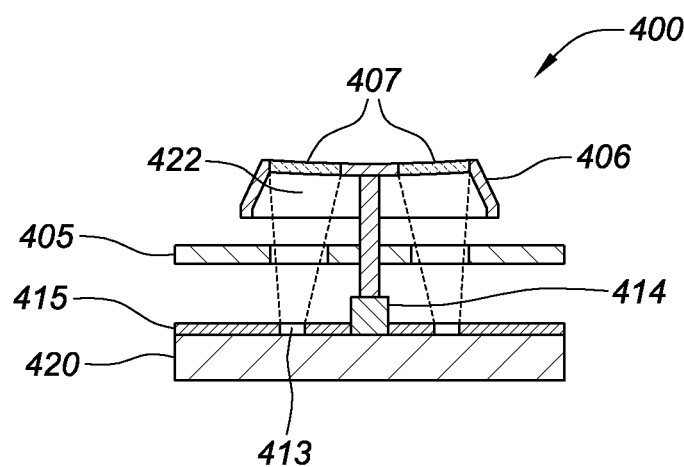
FIG. 4 is a partial cross-sectional side view of a computer keyboard, consistent with various aspects of the present disclosure.

FIG. 4 is a partial cross-sectional side view of a computer keyboard 400, consistent with various aspects of the present disclosure. In the present embodiment, the computer keyboard 400 is a mechanical-switch type keyboard. In operation, a user's selection of key 406 causes the key to vertically travel down and trigger a mechanical switch 414 that either closes or opens a circuit to indicate the selection of the key to a computer. The mechanical 414 switch is mechanically and electrically coupled to a printed circuit board 415, which may include other electronic circuitry for signal processing and conditioning, as well as two-way communication with the computer. In one specific example, the electronic circuitry of the printed circuit board 415 may convert the electrical signal from the user's selection of a key from an analog signal to a digital signal before transmitting the digital signal to the computer.

In the present embodiment of FIG. 4, image projecting means 420 produces two images 422 which extend up through a printed circuit board 415 (through a transparent portion or an aperture 413 therein), through an aperture in upper housing 405, and transparent portions 407 of key 406 to project one or more images on a top surface thereof. Such an embodiment facilitates keyboard applications where multiple data inputs are associated with the same key (e.g., lower case "a" and upper case "A"), thereby allowing both the associated data inputs to be displayed simultaneously.

In other embodiments consistent with the embodiment depicted in FIG. 4, multiple projected images 422 may be projected from different locations on the image projecting means 420 (and through various apertures, optics, or other light manipulating means for refraction, diffraction, reflection, focusing, etc.) around key 406 to produce an image on a top or other surface of the key that appears to be one single uniform image. Such an embodiment may be particularly useful where an image extending across an entire top surface of the key 406 is desirable, such as large type fonts characters (e.g., for user's with visual impairments), or where multiple items are to be displayed simultaneously (e.g., an English letter and a Chinese equivalent).

Figure 5:
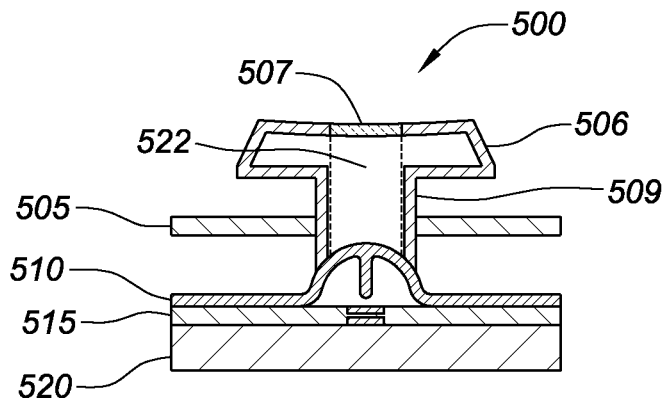
FIG. 5 is a partial cross-sectional side view of a computer keyboard, consistent with various aspects of the present disclosure.

FIG. 5 is a partial cross-sectional side view of a computer keyboard 500, consistent with various aspects of the present disclosure. In the present embodiment, an image 522 projected from an image projecting means 520 is transmitted through portions of key matrix 515, membrane 510, and into an interior portion of a hollow shaft 509 of a key 506 before projecting through a transparent portion 507 of the key and onto a keycap surface. In various embodiments consistent with the present disclosure, the key matrix 515 may comprise a substantially transparent portion or an aperture for facilitating projection of the image through the key matrix. Similarly, the membrane 510 may comprise a substantially transparent portion or an aperture for facilitating projection of the image there through. In more specific embodiments, a shape of the membrane may be engineered for manipulating the projected image as desired, including but not necessarily limited to refraction, diffraction, and reflection.

Similarly, the inner walls of the hollow shaft 509 may be utilized for projecting and/or manipulating the image. For example, the walls of the hollow shaft 509 may be coated with a reflective material to reflect the image within the shaft. In certain implementations, the projected image may be reflected off the reflective inner wall one or more times before being projected onto, for example, a keycap of the key 506 with a greater area than that of the hollow shaft. In the embodiment as shown in FIG. 5, the image is projected linearly up the hollow shaft 509 without any light manipulation, the membrane 510 having optical characteristics that allow for the flow of light through the membrane without perturbing its direction, brightness, and contrast.

Embodiments consistent with that of FIG. 5 may be particularly beneficial to applications including mobile keyboards, where a footprint of each key 506 is limited. In such applications, the small key foot print minimizes the amount of space around a shaft of the key for projecting an image. Moreover, such an embodiment limits the amount of alterations from pre-existing manufacturing processes and parts already being used to manufacture computer keyboards, greatly simplifying implementation and cost associated with such a keyboard.

Embodiments consistent with FIG. 5 may also be amenable to use as a retrofit to existing keyboards where many components may be re-used and a kit with the required replacement components may be purchased by a user for aftermarket installation. In one example implementation of such a retrofit kit, the kit may include a display 520, a replacement membrane 510, and replacement keys 506. In a simpler implementation of a retrofit kit the display 520 is mounted on a top surface of an existing upper housing 505. The placement of the display above the electro-mechanical interface within the existing keyboard eliminates the need to replace a number of parts. As a result, the simplified kit may include the display 520, and replacement keys 506. In such a kit, to facilitate the added z-height of the display outside the upper housing 505, the replacement keys 506 may include extended shafts.

Figure 6:
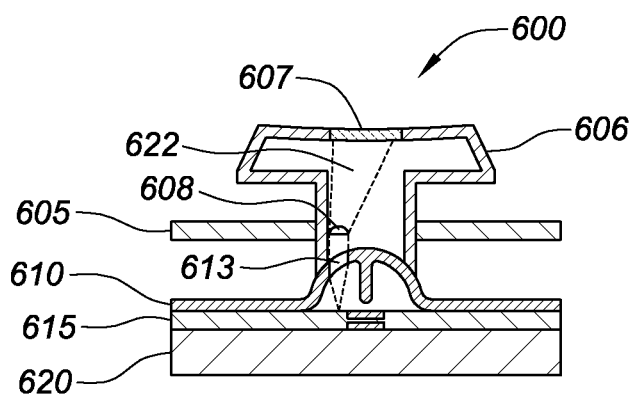
FIG. 6 is a partial cross-sectional side view of a computer keyboard, consistent with various aspects of the present disclosure.

FIG. 6 is a partial cross-sectional side view of a computer keyboard 600, consistent with various aspects of the present disclosure. In the present embodiment, an image 622 is projected from an image projecting means 620, through a portion of a key matrix 615 and an aperture 613 in membrane 610, and into an interior portion of key 606 where a lens 608 or other light manipulating means redirects and expands the light through a transparent portion 607 of the key and onto a top surface of the keycap. In such an embodiment, the key matrix 615 includes material with optical characteristics that render the key matrix substantially transparent allowing the unaltered transmission of the image 622 there through. However, in the present embodiment, the membrane 610 has optical characteristics insufficient for the application, necessitating the aperture 613 through the membrane to limit any adverse effect on resulting image quality and brightness. The aperture 613 may also be utilized to limit the transmission of stray light from the image projecting means 620 to the keycap, thereby mitigating admission of stray light into the inner portion of the key which may result in reduced image clarity, contrast, or saturation. By transmitting the image 622 through the key 606, the image need not be transmitted through upper housing 605.

Figure 7:
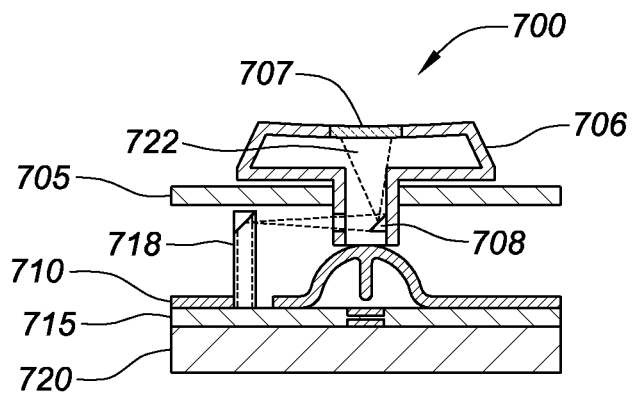
FIG. 7 is a partial cross-sectional side view of a computer keyboard, consistent with various aspects of the present disclosure.

FIG. 7 is a partial cross-sectional side view of a computer keyboard 700, consistent with various aspects of the present disclosure. To display a desired image on a top surface (keycap) of a key 706, an image projecting means 720 generates image 722, which is transmitted through key matrix 715 into a fiber optic cable 718. The fiber optic cable 718 is coupled to the key matrix through an aperture in membrane 710. The fiber optic cable transports the image 722 the length of the cable and emits the image, at a right angle relative to the longitudinal axis of the fiber optic cable, into an inner portion of the key 706 (e.g., via an aperture in the key). Once inside the key 706, the direction of the image 722 is further re-directed by a lens 708 (or other light manipulating means) vertically up a shaft of the key to a transparent portion 707 where the image is visible to a user. Aspects of the present disclosure minimize the transmission of the image 722 through various mediums (e.g., membrane 710, key matrix 715, outer housing 705, etc.) that may have less then desirable optical characteristics, or which may otherwise require a re-design to provide the desired optical characteristics.

Utilizing a fiber optic cable for at least a portion of the image transmission has a number of benefits including minimizing diffusion of light along the transmission path that may otherwise limit the visibility of the image displayed on the top surface of the key 706. In further more specific embodiments, flexible fiber optic cables (e.g., plastic fiber optic cables) may be utilized in a non-linear fashion to deliver the image from the image projecting means 720 to a desired location for display (e.g., a surface of the key visible to a user). Using the present figure, FIG. 7, as an example, a proximal portion of the fiber optic cable may be coupled to the image projecting means 720, inserted through an aperture on a surface of the key 706, and coupled to a transparent portion 707 of the key for displaying the image. In response, to a user input on the key, the fiber optic cable may deflect while maintaining constant transmission of the image from the image projecting means to the keycap.

Figure 8:
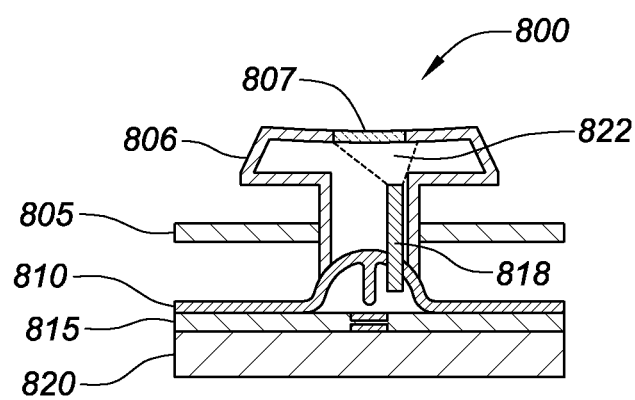
FIG. 8 is a partial cross-sectional side view of a computer keyboard, consistent with various aspects of the present disclosure.

FIG. 8 is a partial cross-sectional side view of a computer keyboard 800, consistent with various aspects of the present disclosure. Similar to FIG. 7, the embodiment of FIG. 8 also utilizes a fiber optic cable 818 to at least partially transport an image from an image projecting means 820 to a keycap of a key 806. The present embodiment benefits from reduced cost and improved manufacturability. Specifically, the fiber optic cable 818 may be coupled to key 806 prior to final assembly of the keyboard 800. Also, during manufacturing of key matrix 815, an aperture may be stamped (or otherwise removed) in the appropriate location for the fiber optic cable to extend through the membrane during final assembly. In operation, the image projecting means 820 transmits an image 822 through an optically transparent portion of key matrix 815 and into the fiber optic cable 818 before being emitted into (or in proximity to) a transparent portion 807 of the key 806. The fiber optic cable 818 extends through an aperture in membrane 810 and up through a lumen of key 806. By vertically extending through the lumen of key 806, the fiber optic cable 818 need not extend through upper housing 805 via an additional aperture therein.

In specific embodiments, consistent with the discussion of FIG. 8 above (among other embodiments), in some applications it may be desirable to maintain the image displayed on the key even when the key is being depressed by a user. In various embodiments, the change in focal length may result in the image appearing out of focus or not being visible at all. To compensate for such changes associated with depression of a key, controller circuitry (either onboard the keyboard or the communicatively coupled computer system) in response to depression of the key may adjust the image projected by the image processing means to compensate for the change in focal length to maintain the focus of the projected image on the key. In yet further embodiments, the controller circuitry may also adjust the image to provide a visual indication of which key is being depressed.

Figure 9:
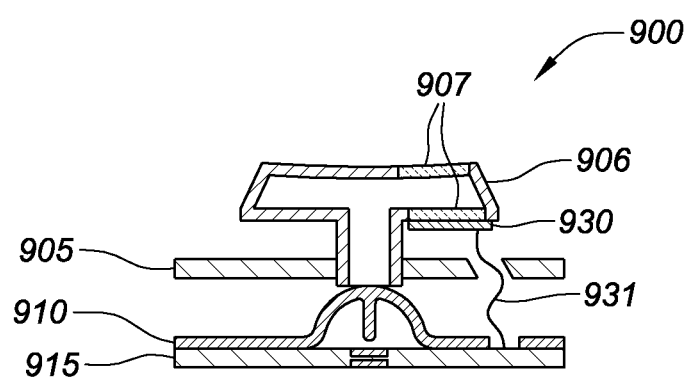
FIG. 9 is a partial cross-sectional side view of a computer keyboard, consistent with various aspects of the present disclosure.

FIG. 9 is a partial cross-sectional side view of a computer keyboard 900, consistent with various aspects of the present disclosure. In the present embodiment, a display 930 is coupled to the underside of a key 906 and projects an image up through transparent portions 907 of the key to a top surface of the keycap. The display 930 is communicatively coupled to the rest of the keyboard circuitry via an electrical connector 931 that extends from the display to a printed circuit board 915 through apertures in the upper housing 905 and membrane 910. In such an embodiment, each key may include a display, or only desired keys may be outfitted with a display. The present embodiment mitigates the complexity associated with transmitting images through various materials with varying optical characteristics between the image projecting means and the keycap.

In yet other embodiments, consistent with the above, the display 930 may be integrated into the key. For example, where the display is visible at a top surface of the key without projecting the image through portions of the key itself, upper housing, membrane, or key matrix. In such an embodiment, the key may be configured to allow for access to a connector port on the display for communicatively coupling the display to a printed circuit board 915 via electrical connector 931.

In further more specific embodiments, the display 930 functions as a keycap and a shaft is mounted to the underside of the display for actuating the membrane, in response to a user selection, and completing a circuit in the key matrix 915 (also referred to as a printed circuit board). In another embodiment, the display 930 may be a touch-sensitive display (e.g., a capacitive touchscreen display) wherein the display both projects an image indicative of the data input associated with the key and also provides an electrical signal to controller circuitry indicative of a selection of the key by the user. In such an embodiment, the longitudinal stroke of the key 906, in response to the selection of the key by the user, and the reactive deformation of the membrane 910 provides the user with a desirable tactical feedback and improved ergonomics, but does not provide any indication to the communicatively coupled computer that the key has been selected (as in a dome-switch type keyboard).

In one embodiment, the display 930 is coupled to a top surface of key 906, and includes optical touch detecting circuitry (e.g., infrared light detecting touch screen circuitry, optical key actuation detection circuitry) to detect when a keycap has been pressed by a user; specifically, by detecting the absence of light caused by the mechanical user input on the one or more keys, and associates the absence of light in proximity to the one or more keys with a specific data input assigned to the one or more keys. The display 930 displaying an image, which in some embodiments is indicative of the data input associated with the key. In such an embodiment, the membrane 910 deforms in response to the longitudinal stroke of the key 906 to provide the user with a desirable tactical feedback and improved ergonomics, but does not facilitate a key matrix providing an indication to the communicatively coupled computer that the key has been selected (as in a dome-switch type keyboard).

Embodiments of the present disclosure may be amenable to various modifications and enhancements as may be necessary for use in various applications, it is understood that such modifications and enhancements are well within the abilities of a skilled artisan in view of the present disclosure. In various uses for projected images on the keyboards keycaps, the keycaps may display a screen saver, including videos and/or images, during periods of inactivity or on-demand based on a user's request, as well as other pertinent information such as news and weather. As discussed in some detail above, the keyboard circuitry may automatically re-map the images displayed on each key based on a new language being selected in the computer's operating system, or the selection of a new keyboard layout.

In further applications of a keyboard consistent with the present disclosure, software may be implemented on the computer communicatively coupled to the keyboard to allow for customization of the images projected on the keycaps. Such customization facilitating personal style, such as the customization of the displayed font colors, key background colors, and type fonts of the alpha-numeric indicators on the keys. Further, banners, graphics, images, and videos may be displayed on the keycaps either inlaid behind alpha-numeric indicators on the keys, or displayed on the keys in the absence of alpha-numeric indicators. In one example embodiment, a portion of a video may be projected on each key of a keyboard, with all the keys substantially projecting the entire video upon the keyboard's keys.

Aspects of the present disclosure are further directed to new operating system standards in which one or more operating systems include pre-installed software for controlling and integrating keyboards consistent with the above disclosure. For example, a global standard may be adopted across operating software platforms that allows for the identification of a keyboard (consistent with aspects of the present disclosure) communicatively coupled to a computer, and for enabling enhanced features within the computer operating system to utilize the keyboards display features in various programs and applications.

In view of the above disclosure, skilled artisans may readily apply the teachings of the present disclosure to various applications. Various specific applications are discussed below and are not intended to be limiting, but instead to provide some examples of how aspects of the disclosure may be implemented.

In applications where the keyboards are to be utilized by visually impaired users, a larger font size may be displayed on the keycaps to facilitate improved identification by such users. Moreover, increased backlighting and/or contrasting between the background color and the font color may further facilitate improved key identification by visually impaired users.

Aspects of the present disclosure may also be utilized for training and education purposes. For example, in a computer-implemented educational software application, where a child is being tested on the order of the alphabet. When asked what letter comes after "D," after a pre-determined time, the computer will send a command to the keyboard to illuminate the letter "E" on the keyboard as a hint. The visual and physical connection between seeing the letter "E" illuminated and physically pressing the button further assists in the association and memorization. As a further example, for training students how to type on a keyboard, a computer may send a command to the keyboard to illuminate the next letter to be pressed (or otherwise distinguish the correct key from the rest of the keys; e.g., increasing the font size, changing the font color, background color, or flashing). This can be particularly beneficial in keyboard training as such a visual indication may help to limit the amount a student looks down at the keys to determine the location of the key which is to be pressed.

In various applications directed to gaming and other computer software related applications, the applications when executed create "hot keys" on the keyboard that are associated with specific commands in the application. However, these so-called hot keys may be difficult for users to remember if there are a large number of such keys or the user is an infrequent user of the application. Once a user executes an application on a computer attached to a keyboard in accordance with the present disclosure, the application via the computer may upload new images to be displayed on the keyboard keycaps indicative of the hot keys specific to the executed application. Such images further facilitate the user's efficient use of the application and their memorization of such hot keys.

In applications where a user regularly uses multiple language layouts on their keyboard, the user may select, via an interface on the computer for example, that the keyboard simultaneously display images on each of the keycaps associated with the user's most used languages to facilitate switching between the keyboard layouts. For example, a keycap may simultaneously display the English letter "A" and the Japanese equivalent "あ".

In one example embodiment of the present disclosure, a keyboard is disclosed with low and normal operating power modes. In such an embodiment, each of the one or more keys includes a printed image on a top surface of the key indicative of the default data input associated with activation of the key. Where the power supplies to a keyboard (e.g., on-board battery supply or computer provided supply of power) falls below a threshold voltage, the keyboard controller circuitry may enter a low-power mode. In some embodiments of a low-power mode, the image projecting means may revert into a low-power mode where the brightness of the projected image is reduced, or the image projecting means is disabled entirely. Where the image projecting means is disabled entirely, the printed images on the top surface of the keys are the only visible indication of the data input associated with the key. In various embodiments, the printed image may be printed with an ink that is rendered invisible at a wavelength produced by a display projecting an image through the keycap. Specifically, for example, the printed image on the key may include an ink with material characteristics including increased optical translucence in response to irradiation of light in a spectrum consistent with a computer display. Accordingly, when the image projecting means displays an image, the printed image is hidden, but the printed image is visible when the image projecting means is disabled.

In other embodiments, the printed image includes a fluorescing ink that becomes visible in response to ultra-violet light. In an embodiment utilizing fluorescing ink, in response to a low-power mode being initiated, the keyboard circuitry disables the image projecting means and enables LEDs that emit light at frequencies within the ultra-violet range to reveal the printed image. When a power supply raises above a threshold voltage, a normal operating mode may resume where the image projecting means projects an image onto the top surface of the key indicative of the specific data input associated with activation of the key, and wherein LEDs are disabled diminishing the visibility of the printed image on the top surface of the key.

In various embodiments of the present disclosure, a key surface matrix of a keyboard may be printed on a surface of an image projecting means, such as a glass or plastic projection screen(s) (e.g., LCD or LED like projection screen(s)). The image projecting means projecting an image through a clear or semi-clear keycap structure of one or more keys and onto a top surface of the keycap for visual identification by a keyboard user.

A keyboard, consistent with the present disclosure, includes a display, or other image projecting means that projects an image onto a keycap surface(s) of one or more keys of the keyboard. In one embodiment, a display may extend below all the keys upon which an image is to be projected, and a single image is projected on the display with the desired sub-images displayed on each of the keycaps. The relative position of each of the sub-images within the image being controlled by the relative position of the keys relative to the display. In one such embodiment, the single image displayed may be static, and the user may control aspects of the display including brightness, sharpness, contour, etc. In more advanced embodiments, the image projected from the display may be dynamic to facilitate adjustment of the sub-images displayed on each of the keycaps (e.g., based on user customization of the keys input functionality). The display may also project videos, animations, or images across one or more of the keycaps. It is important to note that in such embodiments, the operating system may still control the computer input of each key regardless of the image displayed on the keycaps. That is, the image projected on a keycap may not correspond to an input functionality of the key.

An image projected on a keycap by the display may not necessarily be associated with a computer input functionality of the key when depressed. However, in some embodiments, Application Programming Interface ("API") integration may facilitate syncing the images displayed on the keycaps with the respective input functionality of the keys. For example, an API that functions in conjunction with a computer operating system may command keyboard circuitry to display a keyboard language layout on the keycaps associated with the user/operating system selected keyboard layout. Accordingly, the image displayed on the keycap is associated with the computer input in response to that key being depressed. API integration may also facilitate syncing the images displayed on the keycaps with hot keys specific to an active program (e.g., Adobe Suites®, and Final Cut Pro®). When a program is opened that has API integration, the API may automatically detect that a keyboard with a changeable keycap display is present, and command the keyboard to display images on the keycaps associated with the hot keys of the active program.

In gaming applications, an API may facilitate dynamic adjustment of the keyboard layout (e.g., hot keys), and the associated images displayed on the related keys. For example, the selection of one or more keys on the keyboard may trigger a secondary/temporary re-configuration of the one or more hot keys with the gaming application, and the related images displayed on those keys.

Figure 10A:
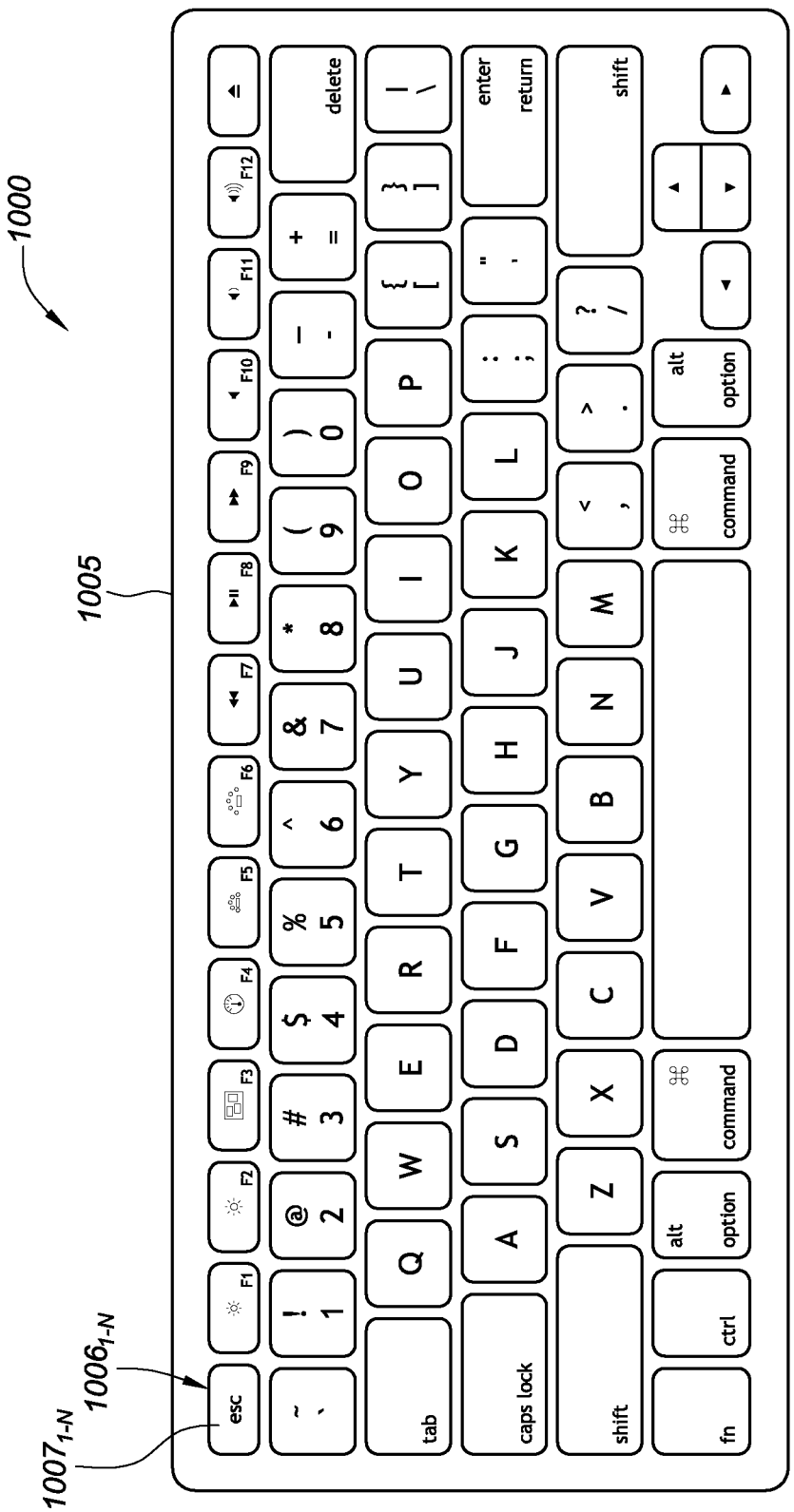
FIGS. 10A-H are top views of a computer keyboard, consistent with various aspects of the present disclosure.

FIGS. 10A-H are top views of a computer keyboard 1000 with each of the keys $1006_{1-N}$ displaying various information via a keycap $1007_{1-N}$, consistent with various aspects of the present disclosure. As shown in FIG. 10A, the keycaps $1007_{1-N}$ of each of the keys $1006_{1-N}$ are projecting/displaying a standard QWERTY-type keyboard layout. As discussed above, one or more displays below each of the keycaps $1007_{1-N}$ may be programmed to display any one of a plurality of images, letters, numerals, or other information (which in many cases may relate to a computer input associated with depressing the key 1006). A graphic processor controlling the one or more displays may be communicatively coupled to a computer processor (or the graphic processor may be integrated with the computer processor). Where the computer keyboard 1000 does not include the graphic processor, for example, the computer keyboard 1000 is dependent upon an external control signal from the computer processor to provide an image for each of the keycaps $1007_{1-N}$. In some embodiments, one or more displays project a single image, with sub-images of the single image being displayed on at least one of the keycaps $1007_{1-N}$. The sub-image displayed on each of the keycaps $1007_{1-N}$ may or may not be associated with the input functionality of that key $1006_{1-N}$ to a communicatively coupled computer.

In some embodiments, in the absence of a control signal from a computer processor indicative of a selected keyboard layout, keyboard controller circuitry (e.g., a graphic processor) may display a default keyboard layout (e.g., QWERTY layout). The keyboard controller circuitry on-board the computer keyboard 1000 may include memory to store images associated with the most common keyboard layouts. With such pre-loaded images, the keyboard controller circuitry may reduce the lag time between selecting a keyboard layout on a connected computer and displaying the respective input for each of the keys 1006 on the keycaps 1007 (as the images need not be transmitted between the computer and the keyboard). In the alternative, software executed on the computer, in response to the selection of a keyboard layout or commencement of use of a particular computer program or application, may upload the associated keycap images to the keyboard controller circuitry on-board the keyboard 1000, and associate the respective keyed inputs received from the keyboard 1000 to the desired computer inputs.

Where the keyboard 1000 is utilized to stream high-definition video and/or images across its keycaps 1007, the keyboard 1000 may be communicatively coupled to a computer terminal which may real-time stream such video and/or images using high-speed data communication protocols (e.g., Thunderbolt or USB-C communication protocols). Such a system may facilitate both static and dynamic configurations of the keyboard 1000, as discussed in more detail above.

To optimize and customize the display images on the keycaps $1007_{1-N}$, settings such as brightness, contrast, saturation, and sharpness of the display may be adjusted. By adjusting contrast, for example, an object associated with the input (e.g., the letter "A") may be made more distinguishable from a background. As shown in FIG. 10A, the letters displayed on the keycaps $1007_{1-N}$ (which are housed within upper housing 1005) may be, for example, white and the background may be black to maximize contrast. The desired amount of contrast often varies from user to user. Similarly, brightness adjustment is also desirable to suit ambient light conditions and user preference. Aspects of the present disclosure are directed to automatic adjustment of such display settings or characteristics (e.g., using a photodiode to provide data related to ambient light conditions to keyboard controller circuitry, and determining and driving the display with optimal display characteristics), manual input at/on the keyboard 1000, and/or input in the computer's graphical user interface.

Figure 10B:
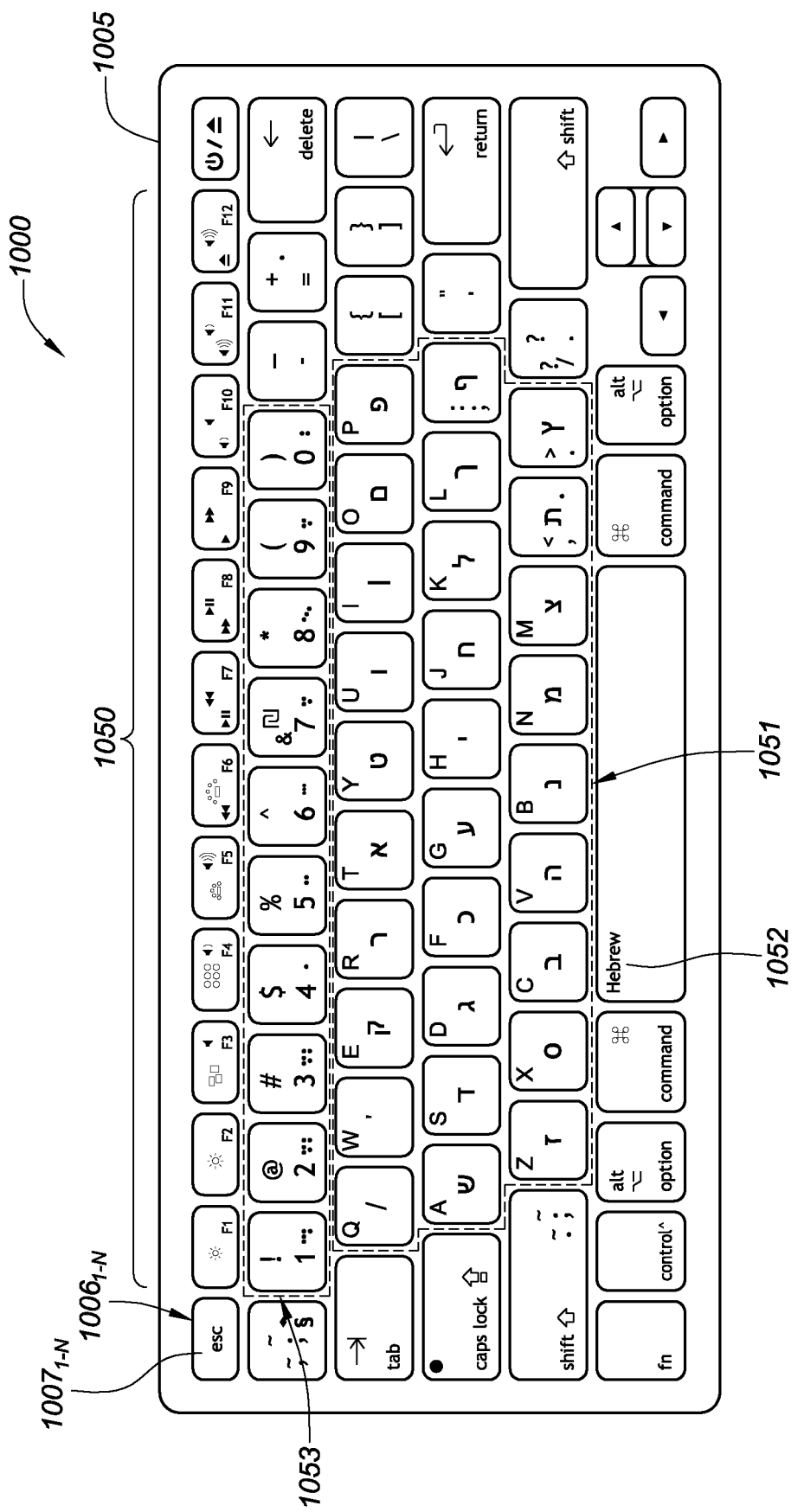

FIG. 10B shows a top view of a keyboard 1000 with a plurality of keys $1006_{1-N}$ housed within a keyboard housing 1005. One or more keycaps $1007_{1-N}$ of the plurality of keys $1006_{1-N}$ may include a display system (e.g., as shown in the various embodiments of FIGS. 2-9). When the computer is in use, the keycaps $1007_{1-N}$ may display symbols associated with a respective input of the key. For bilingual users, a printed keyboard layout showing, for example, a standard QWERTY keyboard may be undesirable as the user's second language may not use the same alphabet. Accordingly, it may be difficult for the user to switch between languages on a computing system, even when the user is bilingual, as the user must memorize the alternative keyboard configuration (or alternatively use two separate keyboards). As shown in FIG. 10B, the keycaps $1007_{1-N}$ of a first set of keys 1051 on a keyboard 1000 have been programmed to display not only a standard QWERTY keyboard layout, but also a Hebrew keyboard layout. By displaying both of these layouts simultaneously, a keyboard user may effortlessly switch back and forth between input types while maintaining a keycap display to which a user may refer to determine an associated input of a given key $1006_{1-N}$ for either keyboard layout type. Based on a user's preference the keycaps $1007_{1-N}$ of the keyboard 1000 may be programmed to display one or more of a plurality of keyboard layouts. To provide a visual indication of which one of the various keyboard layouts displayed is currently the selected keyboard layout of the computer system, one of the keys may display on the keycap 1052 the selected keyboard layout (e.g., "Hebrew").

As further shown in FIG. 10B, a second set of keys 1053 may be customized to display both Arabic and braille numerals. The braille numerals may be displayed on the keycaps 1007 or permanently molded onto a surface of the keycap to provide tactile feedback. Function keys 1050 may be active keys that, based on an open application, display different symbols associated with application-specific functions. In various embodiments of the present disclosure, software on the computer may be used to customize the keyboard layout to include hot keys with custom input-type functionality (which may or may not be associated with a specific application), and with custom and/or stock symbols displayed on the related keycap $1007_{1-N}$ to facilitate identification and selection of a desired hot key or functionality. As explained further below, FIG. 10C shows one example embodiment of such a custom keyboard configuration.

Figure 10C:
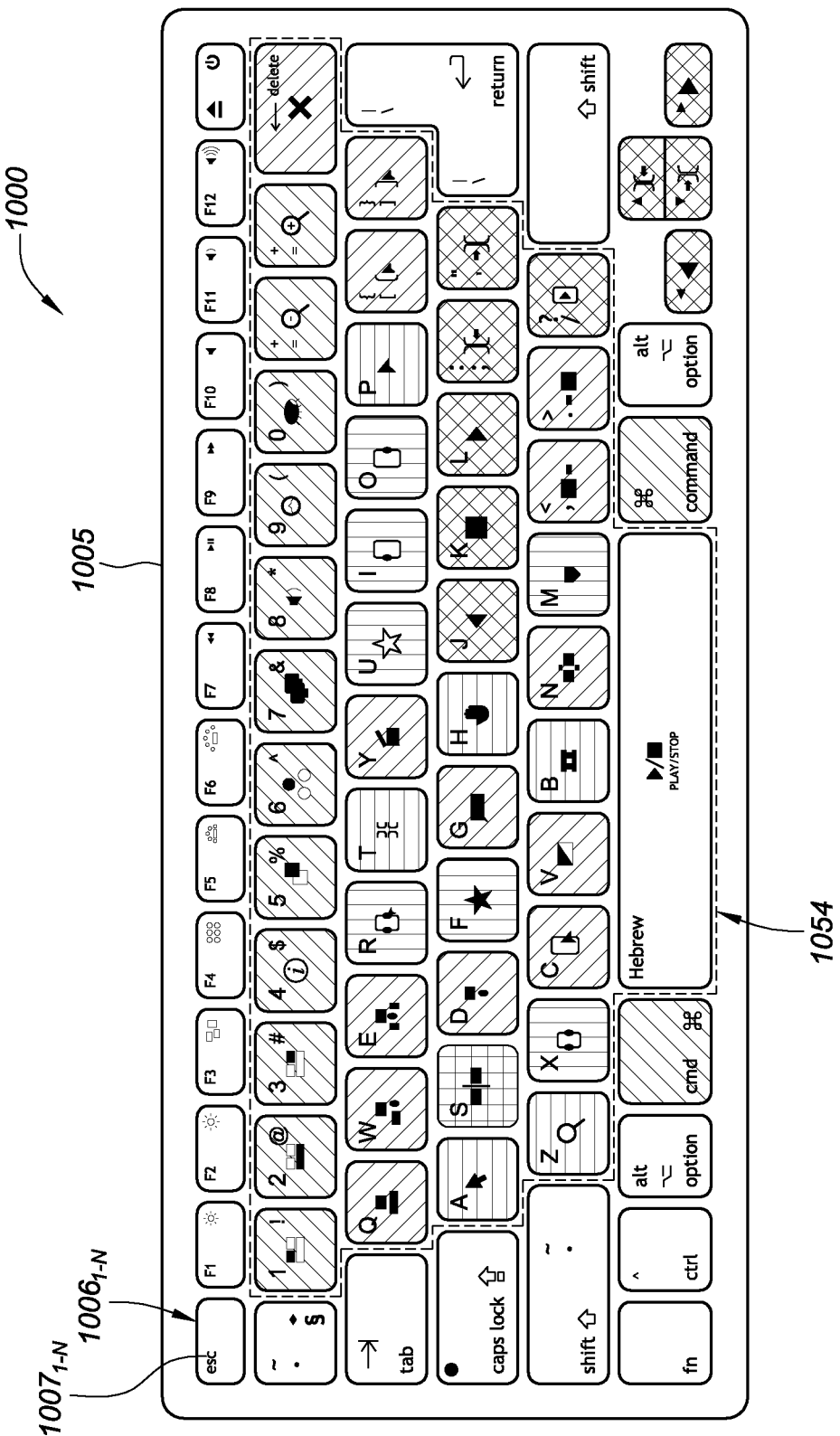

FIG. 10C shows a custom keyboard mapping for use with video editing software. The keycaps $1007_{1-N}$ of the keys $1006_{1-N}$ in keyboard portion 1054 display both a standard QWERTY keyboard layout, as well as hot keys for the video editing software which is being used on the computer terminal. When one of the hot keys is engaged by the user, the computer or controller circuitry of the keyboard 1000 associates that key engagement with the desired hot key function, and the computer executes the function. In response to the user exiting the video editing software, the keyboard may be remapped to display a standard QWERTY layout (or other default keyboard layout) or another application-specific keyboard layout associated with a different active window of the computer, for example. As a user switches between computer programs/applications running concurrently, the keyboard may change to display different graphics, letters, and symbols to desirable program-specific functionality. Computer software providers may write subroutines into their respective code to further facilitate such hot key association and display on keyboards consistent with the present disclosure. With such sub-routines, upon executing the software code in the computer, the computer may execute a custom keyboard mapping and transmit the respective object images for each of the keys $1006_{1-N}$ (which extend out of upper housing 1005) to controller circuitry of the computer keyboard 1000 for displaying on the keycaps $1007_{1-N}$.

Figure 10D:
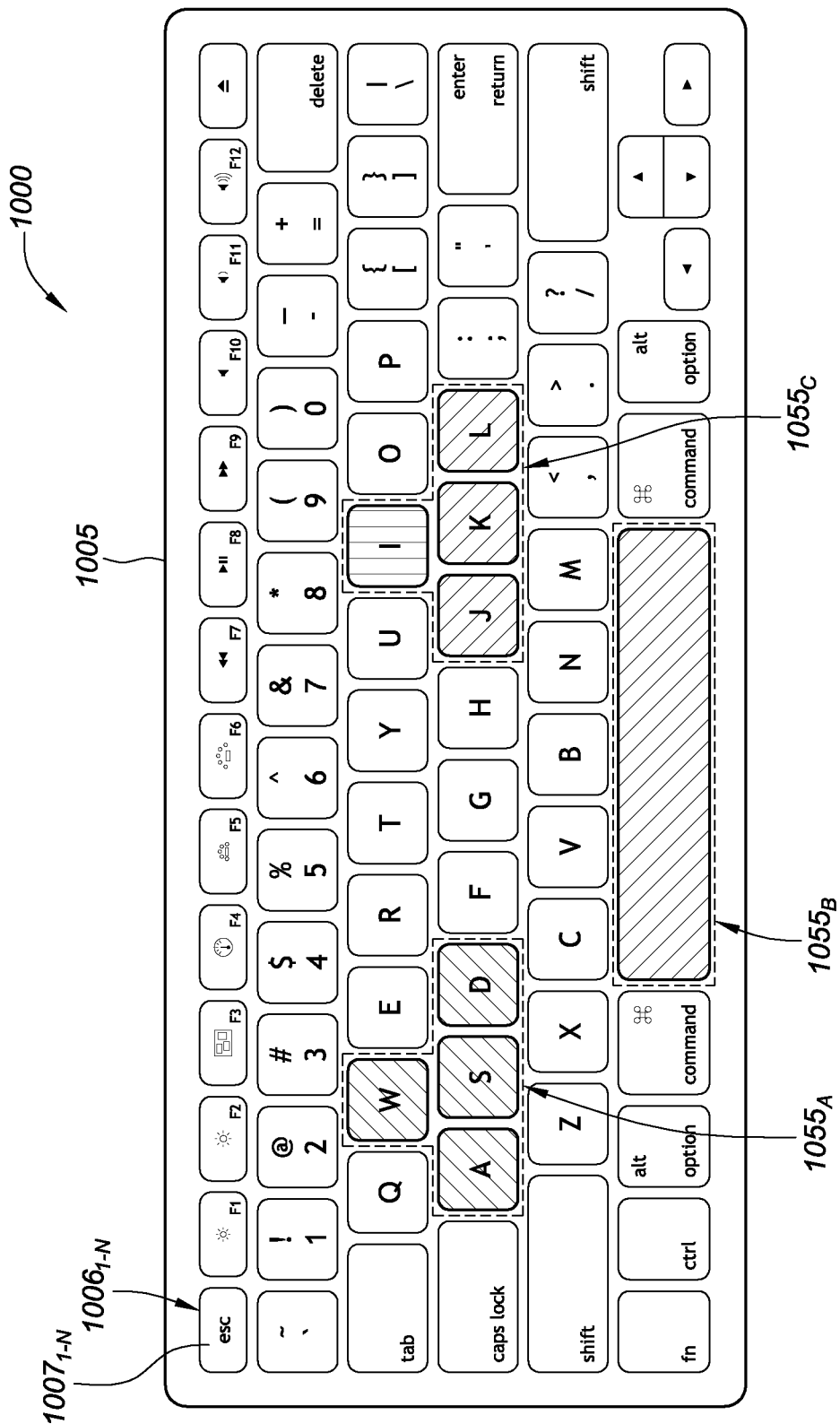

FIG. 10D shows a custom keyboard mapping for use with a video game program. In the present embodiment, a number of keys $1006_{1-N}$ of the keyboard 1000 may maintain the function associated with a standard QWERTY layout, and similarly display objects on the keycaps $1007_{1-N}$ associated with the QWERTY layout. However, first, second, and third portions of the keyboard, $1055_{A-C}$, respectively, have been re-mapped to facilitate specific gaming functionality while the computer program executes the video game program. Accordingly, to visually indicate the change in the first, second, and third keyboard portions $1055_{A-C}$ functionality, the keycaps $1007_{1-N}$ for the keys $1006_{1-N}$ within these keyboard portions display objects based on the received commands from the computer to display objects associated with the keys application-specific functionality. In the present embodiment, to further distinguish the re-mapped keys from the remaining QWERTY keys, the re-mapped keys may also be displayed with, for example, a different background color.

Figure 10E:
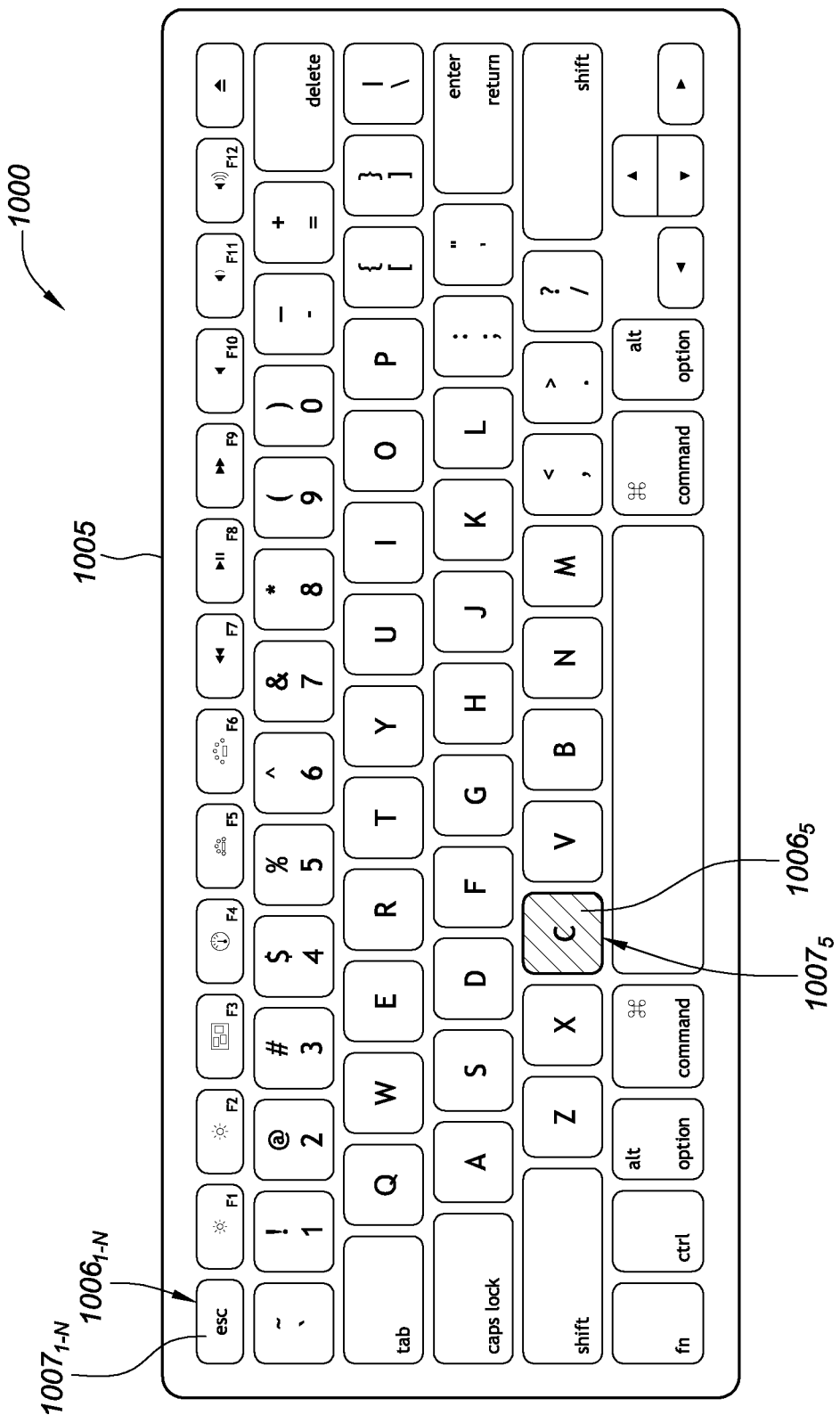

FIG. 10E shows a top view of a keyboard 1000 including a number of keys $1006_{1-N}$ within a keyboard housing 1005. One or more of the keys $1006_{1-N}$ may include keycaps $1007_{1-N}$ with displays that facilitate the projection of images and/or objects onto a top surface (or user-perceptible surface) of the keycaps. One application of such a keyboard 1000 is for training and educational purposes. The keys $1006_{1-N}$ are mapped to a standard QWERTY keyboard layout. When the keyboard 1000 is used in conjunction with a spelling and grammar program on a computer, a display of the computer may prompt the user to spell a word by, for example, providing a visual cue of an image associated with the word (e.g., showing an image of a cat), by playing a sound associated with the word (e.g., playing a "meow" sound), and/or by saying the word aloud (e.g. "cat"). In response, the user is directed to select the keys on the keyboard 1000 associated with the letters to spell the word (e.g., "c-a-t"). Where the user gets "stuck" spelling the word or inputs an incorrect letter, the computer may prompt the keyboard to highlight, bolden, or change the background to contrast the correct key with the rest of the keys—thereby providing a visual hint as to the appropriate letter and further facilitating a visual association in the user's mind as to the correct spelling of the word. As shown in FIG. 10E, the keyboard is displaying a "hint" that key $1006_5$ is the appropriate key to press by displaying the letter "C" on the keycap $1007_5$ with a background that is somehow different from the backgrounds of the other letters displayed on the keycaps 1007 of the keyboard 1000.

In a training application of keyboard 1000 in FIG. 10E, the keyboard may be used to facilitate teaching of computer keyboard typing to a new user. For example, when a user is prompted to press a key $1006_5$ (e.g., a key associated with the data input "C"), keyboard controller circuitry may change some visual cue of the keycap $1007_5$ to facilitate recognition and association of the key $1006_5$ relative to a user's fingers. To minimize "peeking" at the keys, this visual indication may simply include backlighting the keycap $1007_5$ to provide a desired contrast with the other keyboard keycaps 1007.

Figure 10F:
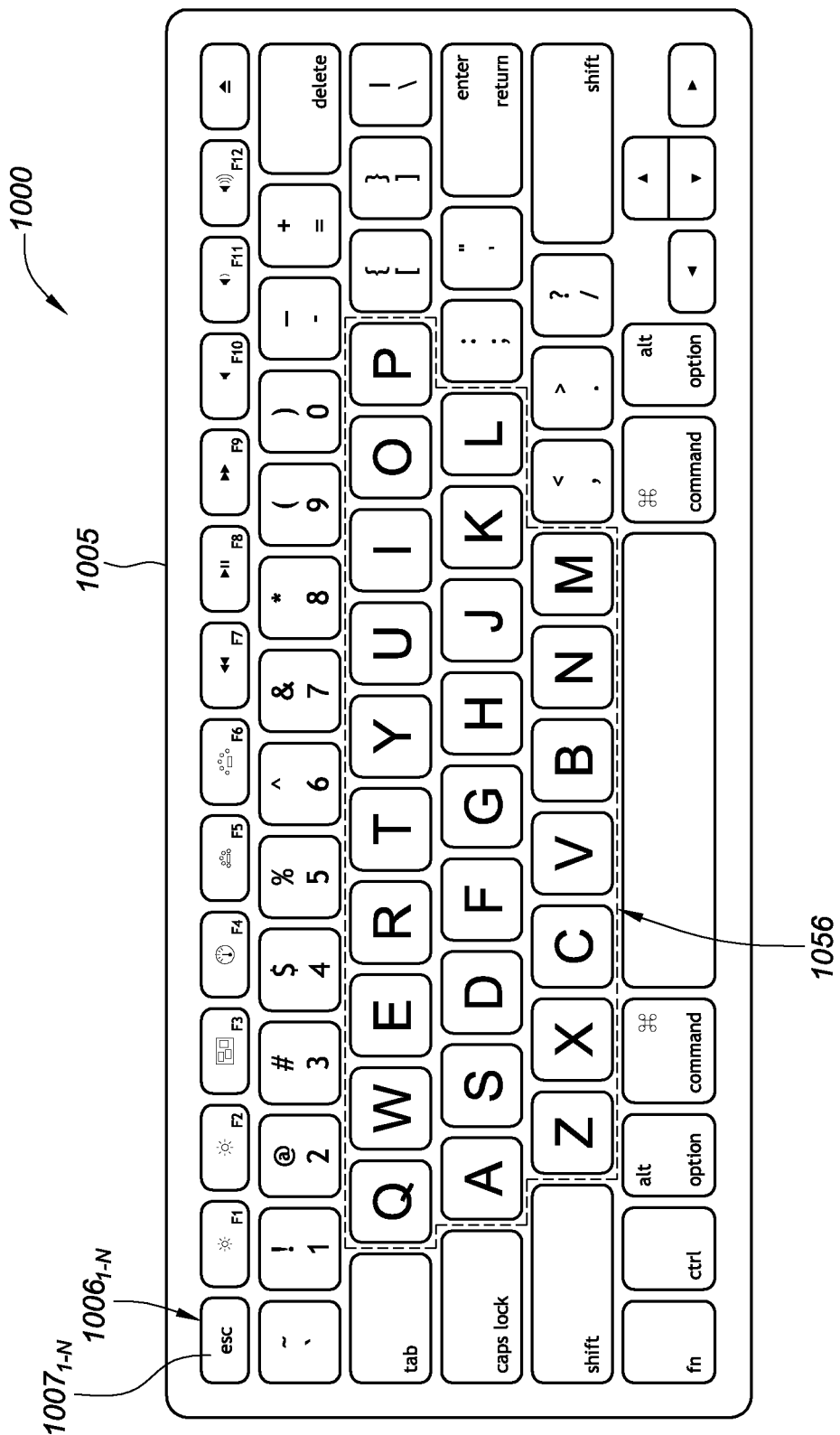

Other applications of the present disclosure may include keyboards at public computer terminals where the keyboard functionality must be intelligible and perceptible to a variety of users. These users may include, for example, users who speak/understand various languages, and users with communicative disabilities. A keyboard as disclosed herein may be utilized to both remap the keyboard layout and to display the associated objects on each of the keycaps indicative of the key's mapped data input. Accordingly, the keyboard may be adjusted to suit any type of user that may require use of the computer terminal. As shown in FIG. 10F, the displayed objects on keycaps $1007_{1-N}$ of each key $1006_{1-N}$ (which extend out of upper housing 1005) may be adjusted to facilitate easier recognition by visually impaired individuals. For example, the objects displayed on the keycaps $1007_{1-N}$ within a first portion 1056 of keys may have a larger font size, be in bold, and/or have a different font that further facilitates object recognition. In FIG. 10F, the letters displayed on the keycaps 1007 within the first portion of keys 1056 are both of larger font size and in bold.

Figure 10G:
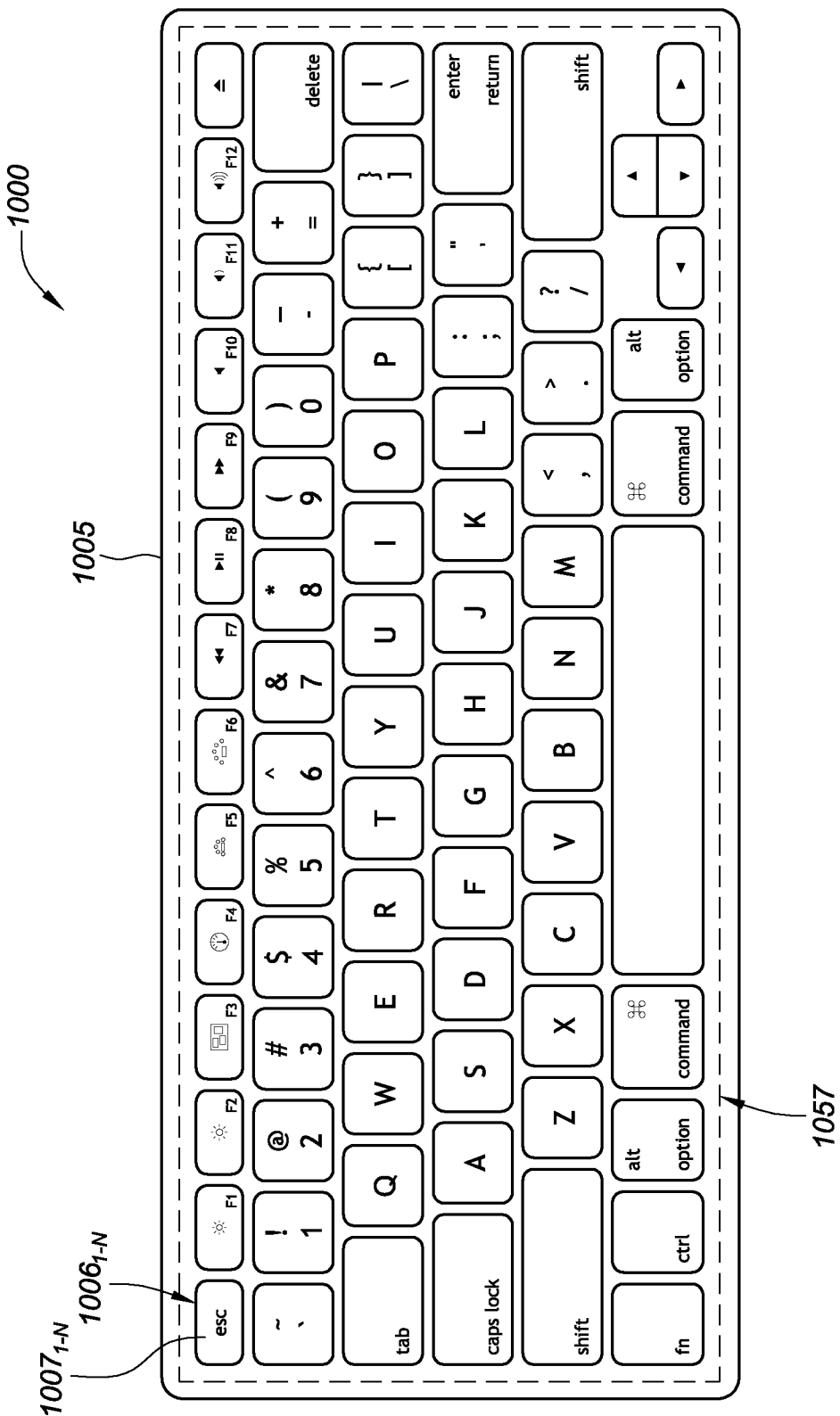

Keyboards consistent with the present disclosure may also be infinitely customizable not only for practical applications (e.g., switching between keyboard layouts, languages, training, hot key mapping, etc.), but also to fit a user's sense of individual style. As shown in FIG. 10G, keycaps $1007_{1-N}$ of the keys $1006_{1-N}$ on keyboard 1000 are displaying a standard QWERTY keyboard layout. However, the font color and the background keycap color of the key portion 1057 have been modified by the user. For example, the user may select a white font with a fuchsia background color. The combinations of, for example, font, color, background color, font and font size are limitless. Also, the user may further personalize the keyboard 1000 by adding a background image on the keycaps 1007, or a screensaver may appear on one more keycaps after some length of inactivity (as shown in FIG. 10H).

Figure 10H:
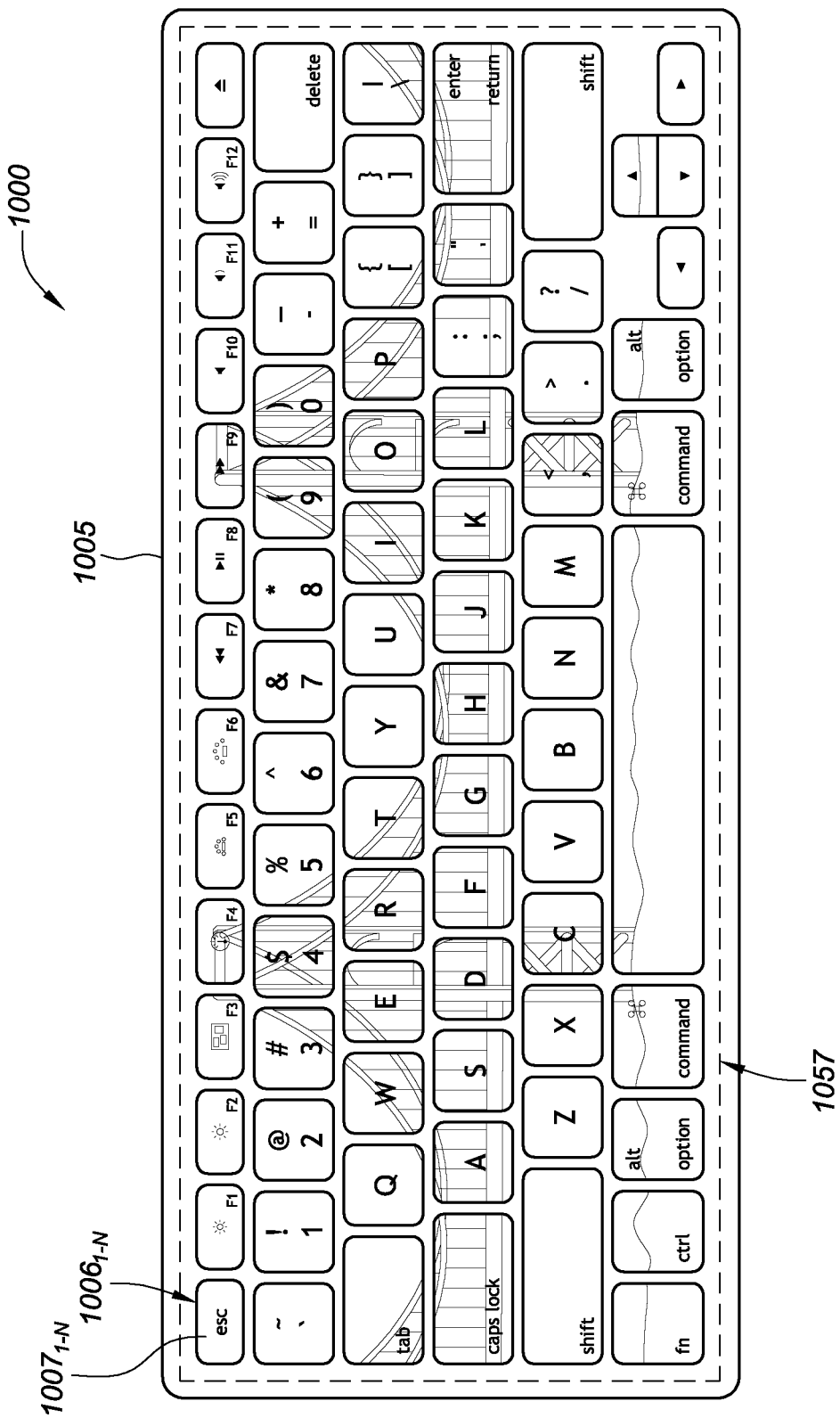

FIG. 10H shows a keyboard 1000 with a keyboard housing 1005 housing a plurality of keys $1006_{1-N}$ within a key portion 1057. One or more of the keys 1006 within the key portion 1057 may include keycaps $1007_{1-N}$ that are capable of displaying an image for visual recognition by a user. In the present embodiment, a user has selected to underlay the QWERTY keyboard layout objects on the keycaps 1007 with an image of their choosing that extends across one or more keys. The image provides a custom look to the keyboard 1000, and the images may further be selected to exhibit traits of the user (e.g., hobbies, past-times, favorite sports teams, family matters, pets, scenery, and other interests). By viewing the image shown in FIG. 10H, a third-party may deduce that the keyboard user likes architecture, for example. After a period of inactivity, the computer terminal and/or keyboard controller circuitry may discontinue displaying the QWERTY keyboard objects on the keycaps 1007, and merely display the image. In yet further embodiments, the key portion 1057 may display videos (e.g., movies, video screen-savers, shows, etc.).

Figure 10I:
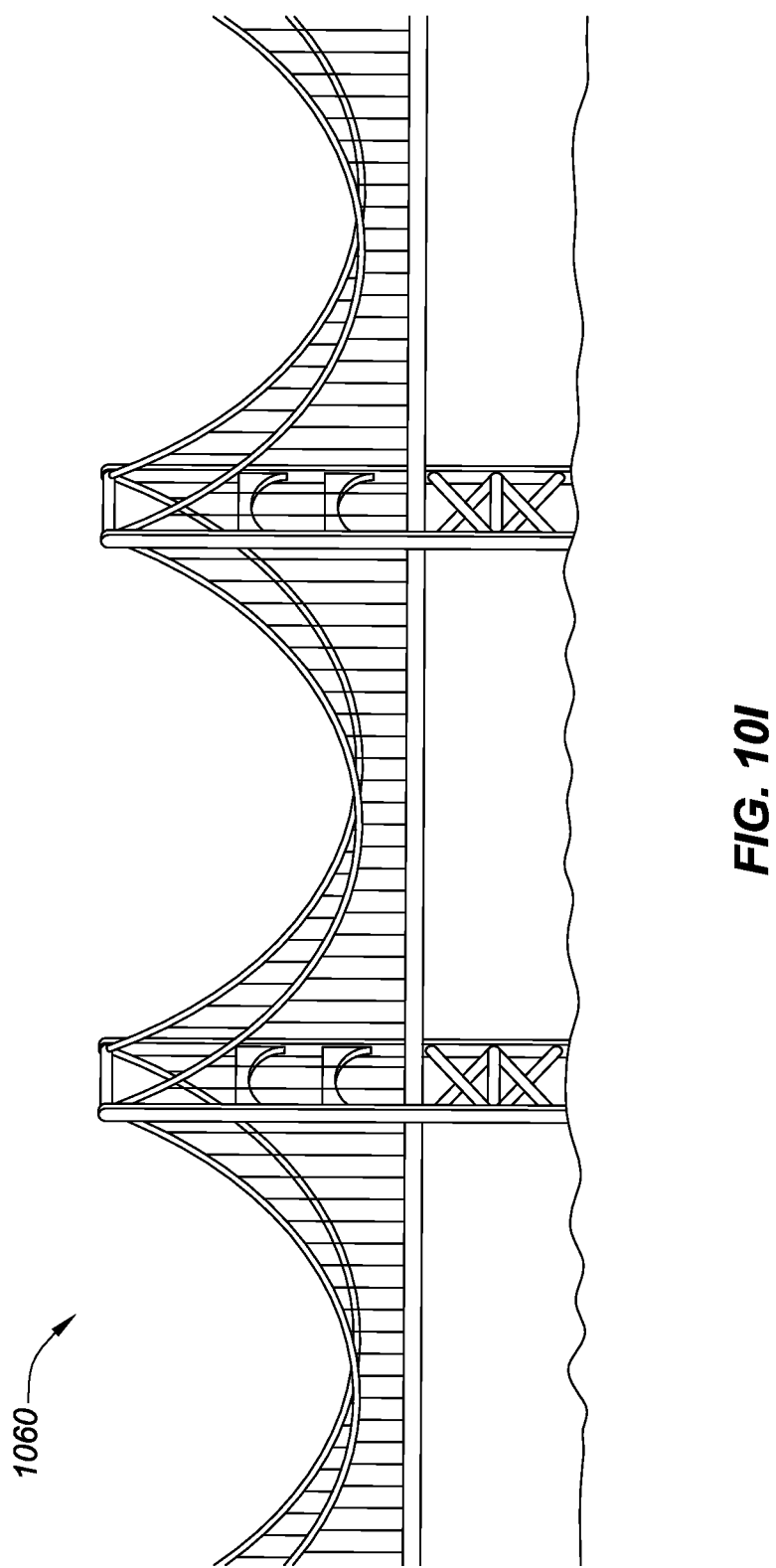
FIG. 10I is a view of the image projected on the keycaps of the computer keyboard of FIG. 10H, consistent with various aspects of the present disclosure.

FIG. 10I is a view of an image 1060 projected on the keycaps of the computer keyboard of FIG. 10H, consistent with various aspects of the present disclosure. As shown in FIG. 10H, portions of the image which are located between relative keycaps 1007 may not be displayed. In yet further more specific embodiments, portions of a keyboard between keys 1006 may also be capable of projecting an image from a display within the keyboard 1000. Accordingly, the keys and the portions of keyboard between the keys may be used to display a complete image.

Figure 11:
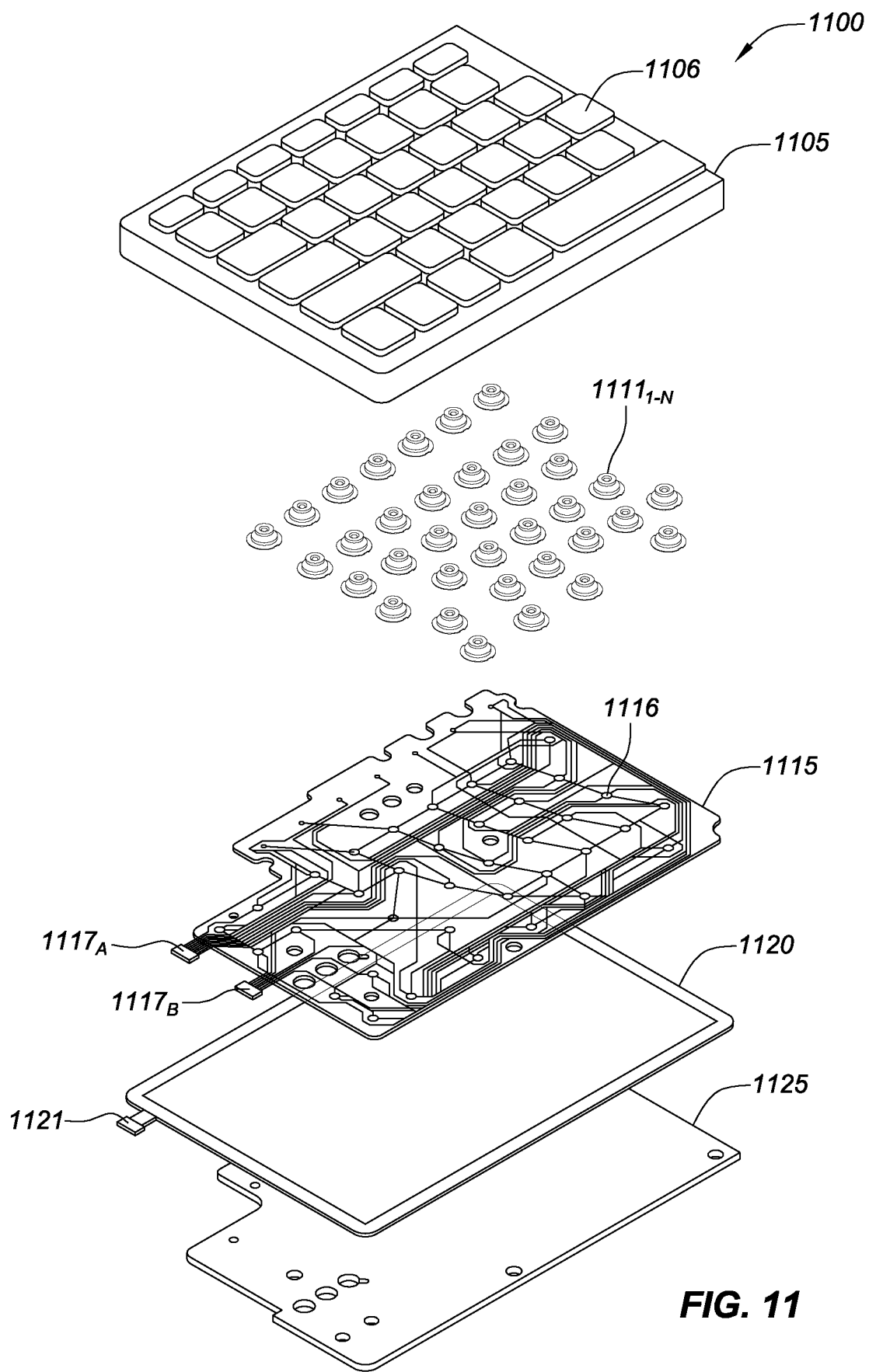
FIG. 11 is an exploded isometric view of a computer keyboard, consistent with various aspects of the present disclosure.

FIG. 11 is an exploded isometric view of a computer keyboard 1100, consistent with various aspects of the present disclosure. The computer keyboard 1100 includes a key matrix 1115 releasably coupled to a plurality of domes $1111_{1-N}$. Opposite the key matrix 1115, the plurality of domes $1111_{1-N}$ are releasably coupled to keys 1106 that are housed in upper housing 1105. Opposite the upper housing 1105, a lower housing 1125 in conjunction with the upper housing encloses the various keyboard components. When one of the keys 1106 are selected by a user, the key is depressed into or toward the upper housing 1105 and deforms one of the plurality of domes $1111_{1-N}$ into contact with an electrical contact switch 1116 associated with the user selected key 1106 (to complete an electrical circuit of the contact switch), thereby activating the contact switch. When communicatively coupled to a computer system, the keyboard 1100 transmits a key code in response to the activation of the contact switch 1116 to the computer system (by way of one or more electrical connectors $1117_A$ and/or $1117_B$). The key code, once received by the computer system, is associated with a specific data input based on a selected keyboard layout. After the user has completed their key selection, the dome 1111 associated with the selected key 1106 returns to its undeformed shape, allowing the contact switch 1116 to discontinue conducting, and returning a key to its initial position. The key matrix 1115, the plurality of domes $1111_{1-N}$, and the one or more keys 1106 are collectively referred to herein as an electro-mechanical interface.

Applicant has discovered numerous benefits to having independent domes $1111_{1-N}$, as opposed to domes mechanically coupled to one another via a membrane (see, e.g., FIG. 1). For example, the key presses exhibit an improved tactile user experience, and more reliable activation of contact switch 1116. Moreover, where one or more of the domes $1111_{1-N}$ of the membrane become misaligned relative to a contact switch, the other domes may also be pulled out of alignment with their respective paired contact switches resulting in undetected key presses and/or failure of a dome to return to its undeformed shape causing a continuous, false key press.

As further shown in FIG. 11, an image projecting means 1120 is positioned underneath key matrix 1115. The image projecting means 1120 may project one or more images up through transparent portions of the key matrix 1115 and one or more of the plurality of domes $1111_{1-N}$, and onto a surface of the one or more keys in response to a control signal received by the image projecting means 1120 via electrical connector 1121. In more specific embodiments, at least a portion of the one or more keys is transparent to allow the image to be projected up through the key and onto a top surface of the key (a top portion of the key also referred to as a keycap) for viewing by a user. Moreover, all or portions of the upper housing 1105 may also be transparent to facilitate projection of images between the keycaps (or a single image across a plurality of the keys 1106 and the upper housing 1105). By displaying the image across both the keycaps of the keys 1106 and the upper housing 1105, a more complete image may be visible, and thereby more easily identifiable.

Figure 11A:
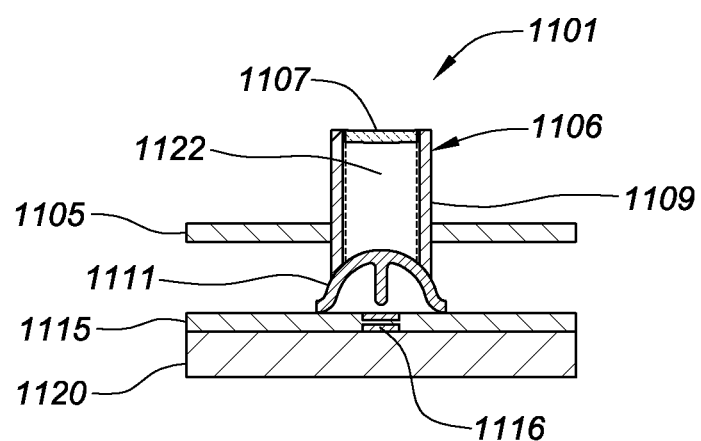
FIG. 11A is a partial cross-sectional side view of the computer keyboard of FIG. 11, consistent with various aspects of the present disclosure.

FIG. 11A is a partial cross-sectional side view of the computer keyboard 1101 of FIG. 11, consistent with various aspects of the present disclosure. In the present embodiment, an image 1122 projected from an image projecting means 1120 is transmitted through portions of key matrix 1115, dome 1111, and into an interior portion of a hollow shaft 1109 of a key 1106 before projecting through a transparent portion 1107 of the key and onto a keycap surface. In various embodiments consistent with the present disclosure, the key matrix 1115 may comprise a substantially transparent portion or an aperture for facilitating projection of the image through the key matrix. Similarly, the dome 1111 may comprise a substantially transparent portion or an aperture for facilitating projection of the image there through. In more specific embodiments, a shape of the dome 1111 may be optically enhanced for manipulating the projected image as desired, including but not necessarily limited to refraction, diffraction, and reflection. In the embodiment as shown in FIG. 11A, the image is projected linearly up the hollow shaft 1109 without any light manipulation, the dome 1111 having optical characteristics that allow for the flow of light through the dome 1111 without perturbing its direction, brightness, and contrast. As each dome 1111 is independent of one another, the image projecting means 1120 may also transmit portions of a larger image or individual images through the key matrix 1115 and directly onto a top surface of a transparent upper housing 1105, without the optical interference of a membrane. As a result, a contiguous image may be displayed over a number of keycaps and the area of the upper housing 1105 between the keycaps. This may be particularly advantageous as the deformation of a dome 1111, during a key press, will not affect the image quality/ location being displayed on the keycaps of adjacent keys. This is due to the domes 1111 not being mechanically coupled to one another via a membrane that may otherwise laterally offset the centerline of an adjacent dome during deformation—thereby altering the position of the image displayed on the adjacent keycap.

In the embodiment of FIG. 11A, a force exerted on the key 1106 causes shaft 1109 of the key to extend through an aperture in upper housing 1105 and deform dome 1111 into contact with contact switch 1116—thereby completing an electrical circuit.

Figure 11B:
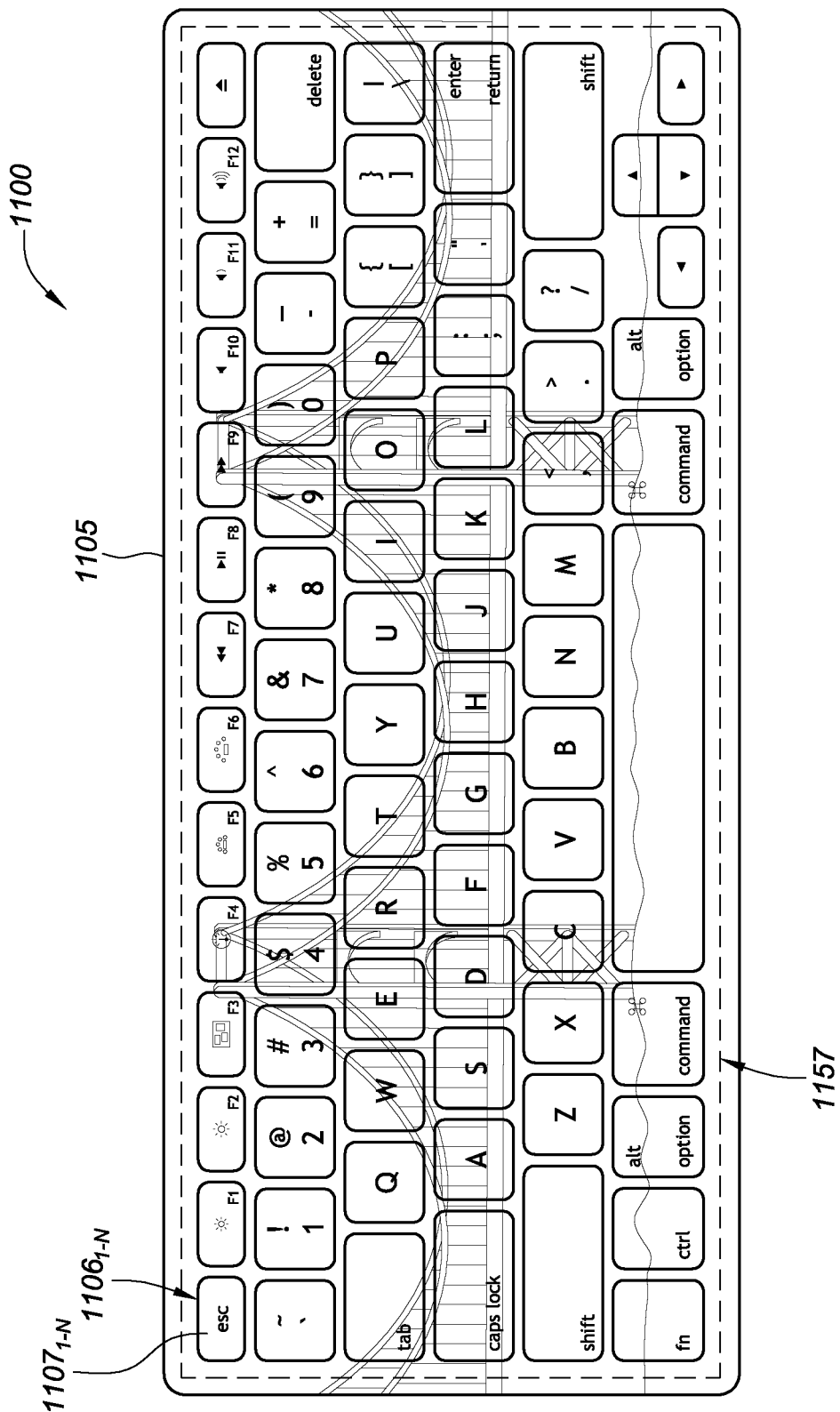
FIG. 11B is a top view of the computer keyboard of FIG. 11, consistent with various aspects of the present disclosure.

FIG. 11B is a top view of the computer keyboard 1100 of FIG. 11, consistent with various aspects of the present disclosure. As shown in FIG. 11B, the keyboard 1100 includes a keyboard upper housing 1105 that houses a plurality of keys $1106_{1-N}$ within a key portion 1157. One or more of the keys 1106 within the key portion 1157 may include keycaps $1107_{1-N}$ that are capable of displaying an image for visual recognition by a user. Moreover, and as discussed in reference to FIG. 11A above, the upper housing 1105 may be transparent and thereby facilitate the display of an image or a portion of a larger image displayed on one or more keycaps $1107_{1-N}$. In the present embodiment, a user has selected to underlay the QWERTY keyboard layout objects on the keycaps 1107 with an image of their choosing that extends across one or more keys and the upper housing 1105 there between. By displaying the image across both the keycaps $1107_{1-N}$ and the upper housing 1105, the keyboard 1100 provides an enhanced user experience devoid of image/ pixel dead zones between the respective keycaps $1107_{1-N}$ that may otherwise limit user recognition of an image, video, object, etc.

Figure 12A:
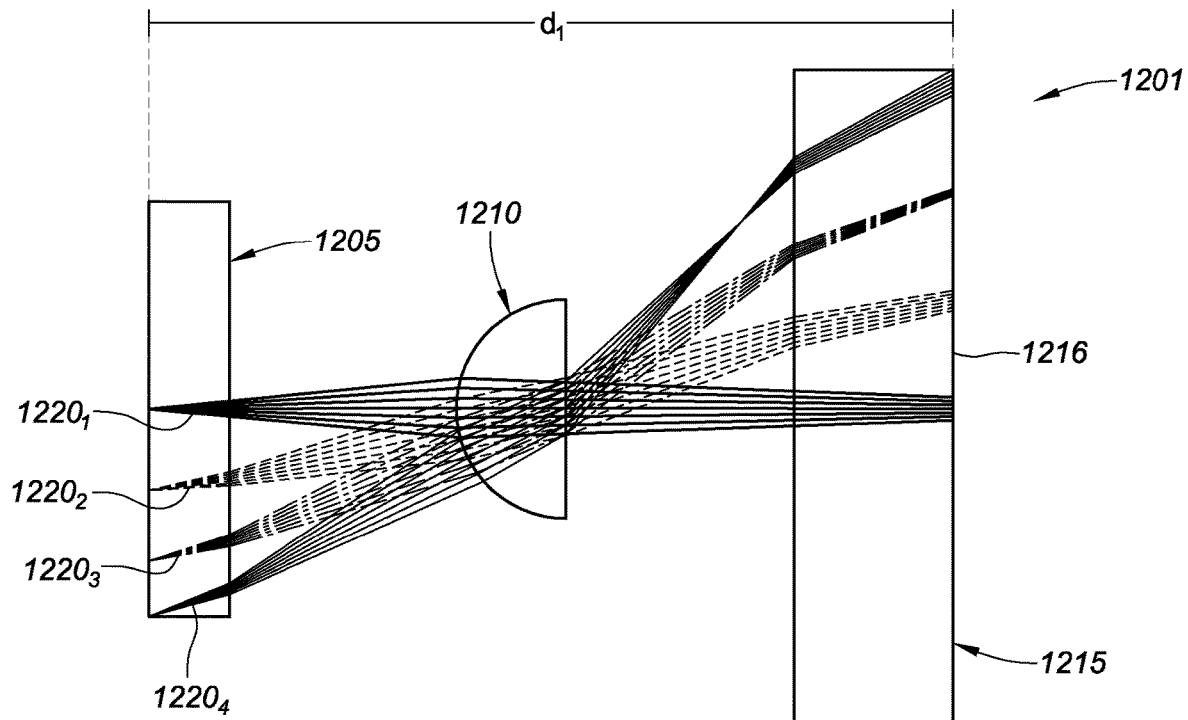
FIG. 12A is a cross-sectional side view of a first embodiment of a computer keyboard key illustrating an optical ray path up through the key, consistent with various embodiments of the present disclosure.

FIG. 12A is a cross-sectional side view of a first embodiment of a computer keyboard key assembly 1200, further illustrating optical ray paths $1220_{1-4}$ generated by an image projecting means 1205 up through the key assembly 1200. The image projecting means 1205 may be, for example, a liquid crystal display. A portion of the optical rays $1220_{1-4}$ associated with that image/light generated by the image projecting means 1205 are illustrated as the rays travel up from the image projecting means 1205, through a lens 1210, and onto an outer surface 1216 of a keycap 1215. The resulting image displayed on the keycap 1215 being visible to a keyboard user. In the present embodiment, the total vertical distance traveled by the optical rays $1220_{1-4}$ is 15 millimeters (di), which corresponds to the thickness of many common keyboard key assemblies.

In the first embodiment of FIG. 12A, the image projecting means 1205 includes a glass cover of 1.5 millimeter thickness through which the optical rays $1220_{1-4}$ travel through after being generated by the image projecting means. The optical rays $1220_{1-4}$ then travel through an air gap before arriving at a half-ball lens 1210. In the present embodiment the half-ball lens 1210 has a 2 millimeter radius and is positioned at a mid-point of the computer keyboard key assembly 1200. The optical rays 1220$_{1-4}$ then travel through another air gap before arriving and traveling through a translucent portion of a keycap 1215. In the present embodiment, the translucent portion of the keycap consists of polycarbonate of approximately 3.0 millimeters in thickness.

The resulting image on the outer surface 1216 of the keycap 1215 is inverted and must accordingly be accounted for when generating an image to be projected by the image projecting means 1205. Moreover, in the present embodiment, the image displayed on the keycap 1215 is larger than the image originally generated by the image projecting means 1205. For example, in some embodiments the original image generated on the image projecting means 1205 may be 4×4 millimeters and the displayed image on the keycap 1215 is 8×8 millimeters. Such an optical solution may be particularly beneficial for various keycap embodiments disclosed throughout the present application—particularly those where a stem of a key has a reduced opening (or where mechanical components associated with key actuation block a portion of the image projecting means 1205).

In various embodiments of the present disclosure, an outer surface 1216 of the keycap 1215 may further include a plastic diffusing film to facilitate enhance viewing angles of the image displayed on the keycap. In some additional embodiments, an aperture may also be positioned between the lens 1210 and the keycap 1215 to filter out light rays emitted from the image projecting means 1205 but that have not travelled through the lens 1210.

Figure 12B:
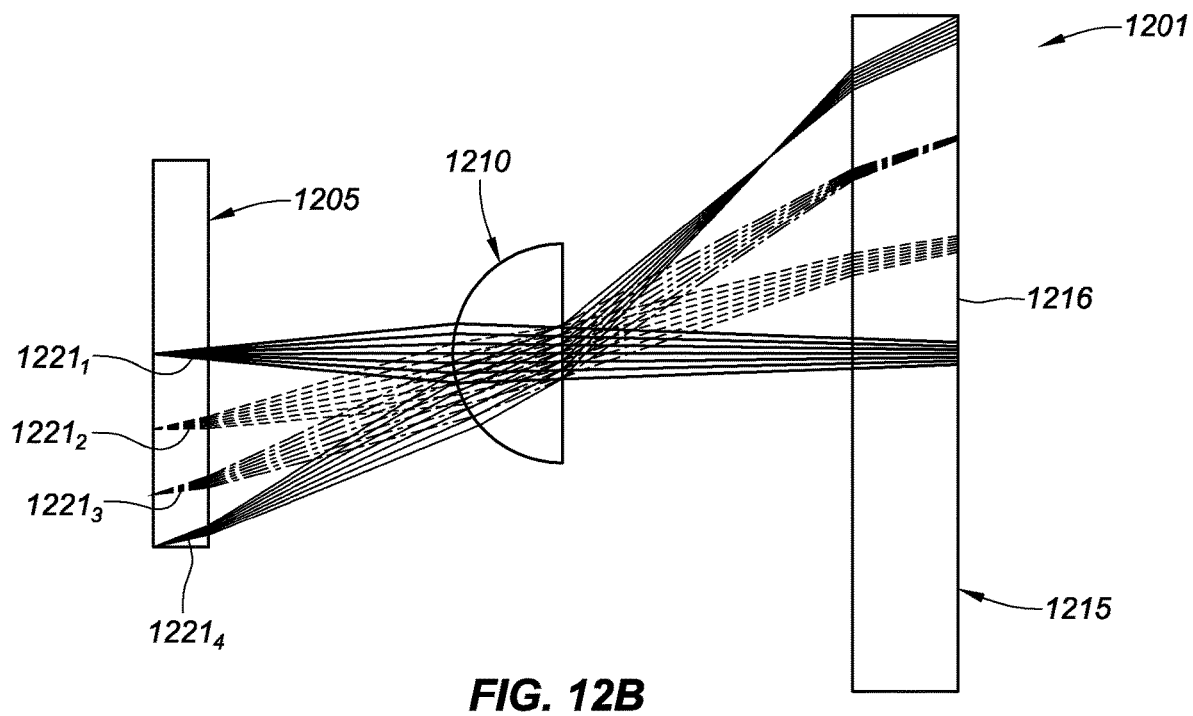
FIG. 12B is a cross-sectional side view of a second embodiment of a computer keyboard key illustrating an optical ray path up through the key, consistent with various embodiments of the present disclosure.

One benefit of the present computer keyboard key assembly 1200 embodiment, and that disclosed in reference to FIG. 12B, is that the optical rays 1220$_{1-4}$ ultimately displayed on the keycap do not emanate from the image projecting means 1205 at high angles of incidence. As a result, the image projecting means 1205 utilized for the application may not be application specific.

FIG. 12B is a cross-sectional side view of a second embodiment of a computer keyboard key assembly 1201 illustrating optical ray paths 1221$_{1-4}$ travelling up through the key assembly 1201. An image/light is generated by an image projecting means 1205 and a portion of the optical rays 1221$_{1-4}$ associated with that image/light are illustrated as the rays travel up from the image projecting means 1205, through a lens 1210, and onto an outer surface 1216 of a keycap 1215. The total vertical distance traveled by the optical rays 1221$_{1-4}$ is approximately 15 millimeters.

In the second embodiment of FIG. 12B, the image projecting means 1205 includes a glass cover of 1.0 millimeter thickness through which the optical rays 1220$_{1-4}$ travel through after being generated. The optical rays 1220$_{1-4}$ then travel through an air gap before arriving at a half-ball lens 1210. In the present embodiment the half-ball lens 1210 has a 2 millimeter radius and is positioned at approximately a mid-point of the computer keyboard key assembly 1201. The optical rays 1221$_{1-4}$ then travel through another air gap before arriving and traveling through a translucent portion of a keycap 1215. In the present embodiment, the translucent portion of the keycap consists of polycarbonate of approximately 2.0 millimeters in thickness. Due to the decreased thicknesses of the keycap and glass cover, compared to the first embodiment of FIG. 12A, the optical rays 1221$_{1-4}$ travel through air gaps with an increased distance of 1.5 millimeters.

As in the first embodiment, the resulting image on the outer surface 1216 of the keycap 1215 is inverted and the displayed image is larger than the image originally generated by the image projecting means 1205.

Figure 12C:
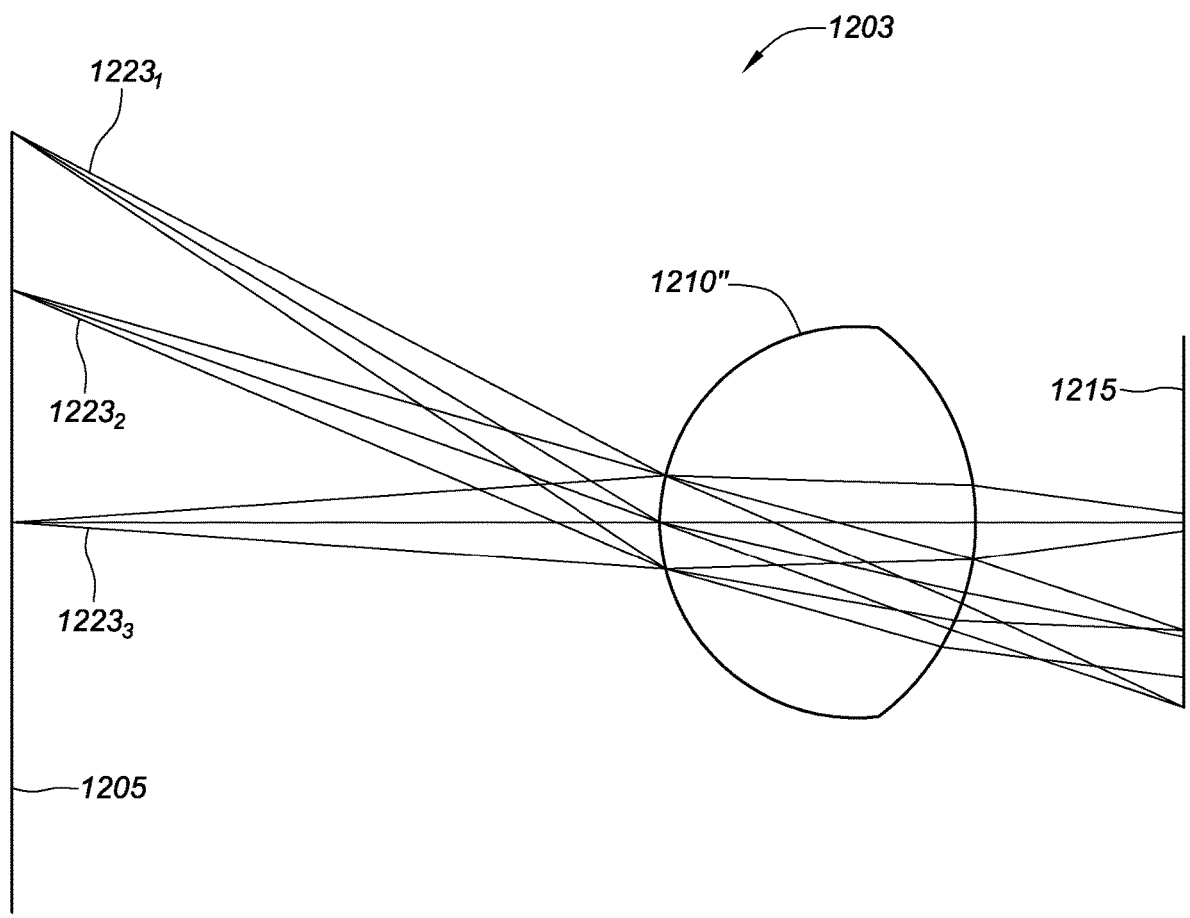
FIG. 12C is a cross-sectional side view of a third embodiment of a computer keyboard key illustrating an optical ray path up through the key, consistent with various embodiments of the present disclosure.

FIG. 12C is a cross-sectional side view of a third embodiment of a computer keyboard key 1203 illustrating optical ray paths 1223$_{1-4}$ traveling up through the key. An image/light is generated by an image projecting means 1205 and a portion of the optical rays 1223$_{1-3}$ associated with that image/light are illustrated as the rays travel up from the image projecting means 1205, through a lens 1210″, and onto a keycap 1215. The image projecting means 1205 has a display area that is approximately 10×10 millimeters and the generated image on the keycap 1215 is approximately 5×5 millimeters. To facilitate a reduced image size on the keycap, the lens 1210″ is positioned proximally to the keycap 1215 (approximately 5 millimeters from an inner surface of the keycap 1215). A total distance between the image projecting means and a top surface of the keycap is approximately 15 millimeters.

The third embodiment has a spot size on the keycap 1214 of 100 micrometers resulting in an optical resolution of 10 points per millimeter. To the eye of an observer, this is a sharp image.

The lens 1210″ of the third embodiment may be an aspheric lens. Similar to some of the previously disclosed embodiments, an outer surface of the keycap 1215 may have a plastic diffusing film to facilitate larger viewing angles of a user.

Figure 13A:
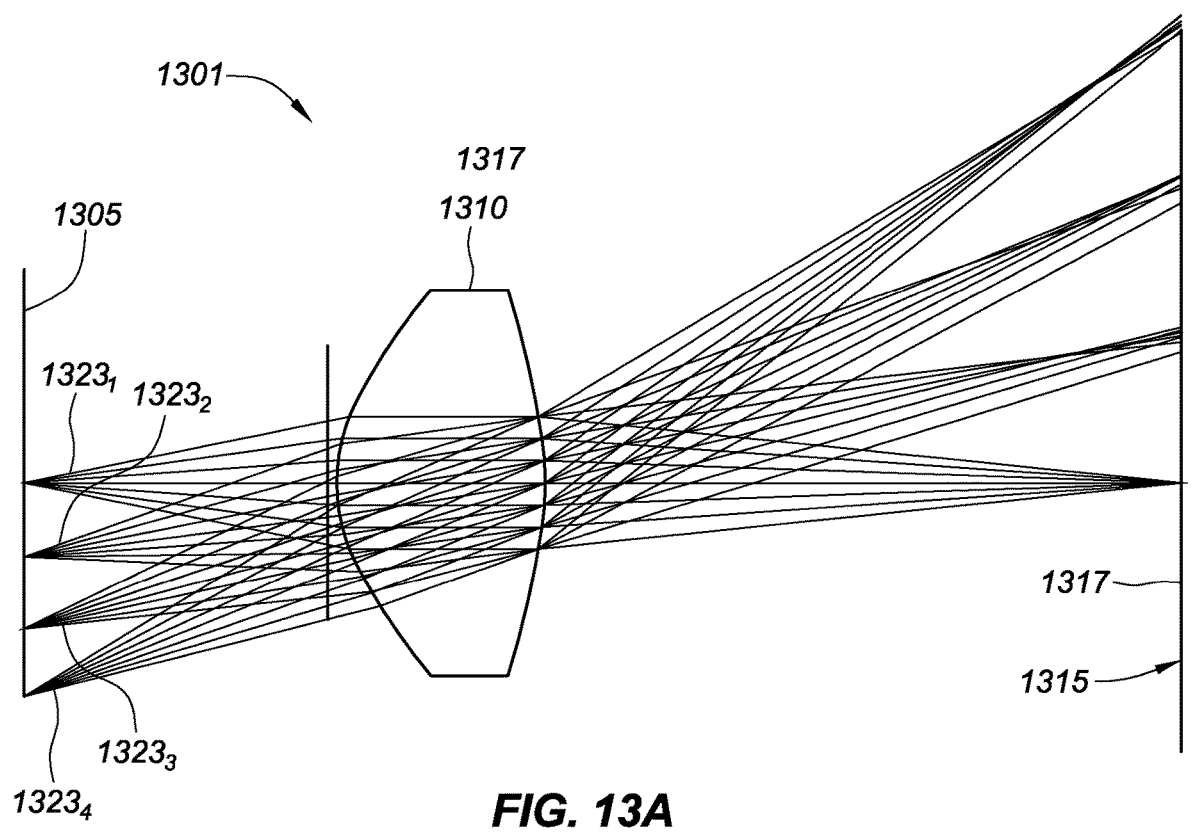
FIG. 13A is a cross-sectional side view of a fourth embodiment of a computer keyboard key illustrating an optical ray path up through the key, consistent with various embodiments of the present disclosure.

FIG. 13A is a cross-sectional side view of a fourth embodiment of a computer keyboard key 1301 illustrating optical ray paths 1323$_{1-4}$ traveling up through the key. After being generated by image projecting means 1305 the rays travel through an air gap to an aspheric lens. In some specific embodiments, the aspheric lens may consist of polymethyl methacrylate (also known as PMMA) and have a 1.7 millimeter diameter aperture at a top of the aspheric lens (the side nearest the keycap 1315). The bottom of the lens being positioned approximately 10 millimeters from an inner surface 1317 of the keycap 1315.

In the third embodiment, the generated image by the image projecting means 1305 is approximately 4×4 millimeters and the displayed image on keycap 1315 is approximately 8×8 millimeters. One particular benefit of the present, third embodiment is that the angles of incidence for the optical ray paths 1323$_{1-4}$ traveling up through the key are quite low. As a result, the present embodiment need not utilize an image projecting means 1305 with a large viewing angle and more of the light from the image projecting means 1305 ultimately reaches the keycap 1315.

Figure 13B:
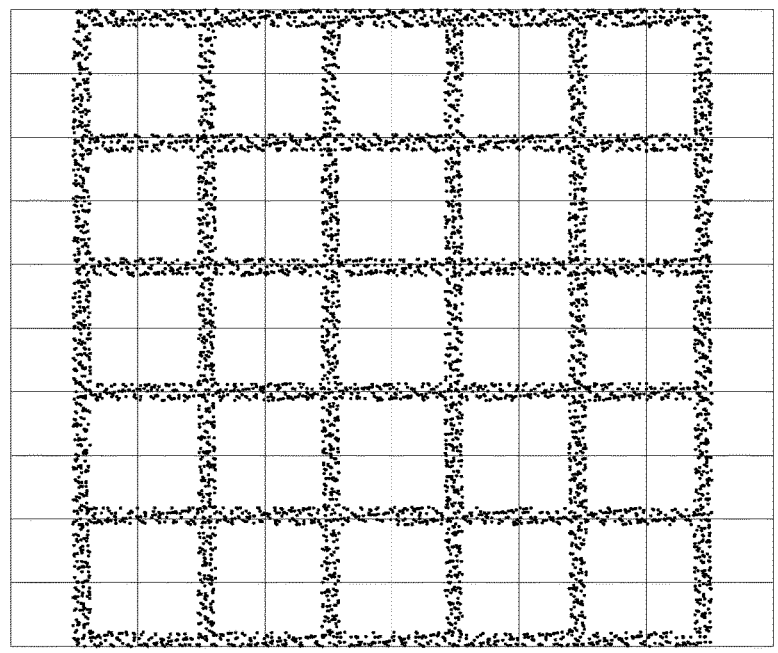
FIG. 13B is a computer generated image analysis of a resulting image on a keycap of the fourth embodiment of the computer keyboard key of FIG. 13A, consistent with various embodiments of the present disclosure.

FIG. 13B is a computer generated image analysis of a resulting image on a keycap of the fourth embodiment of the computer keyboard key of FIG. 13A. In the analysis of FIG. 13B, the image displayed through the key 1301 is a simple grid pattern generated by the image projecting means 1305. The spot size at the top of the keycap 1315 is approximately 150 micrometers with the image projecting means 1305 producing pixels no larger than approximately 100 micrometers. To maximize brightness at the keycap 1315, the lens 1310 has a large aperture (approximately F/5). As shown in the computer generated image 1302 of FIG. 13B, the optical properties of the key 1301 of FIG. 13A produces a grid of approximately 8×8 millimeters with the following optical characteristics: sharp, uniform brightness, and low optical distortion.

In another specific embodiment, a generated image on an image projecting means may be 6×6 millimeters, and the resulting image on the keycap after the lens focuses the light from the image projecting means is 10×10 millimeters.

In some specific computer keyboard key embodiments, it may be desirable to have a display on the keycap that is greater than 10×10 millimeters (but where the z-dimension of the assembly remains approximately 15 millimeters). In such embodiments, a more complicated lens (i.e., lens with two elements) is necessary.

Figure 14A:
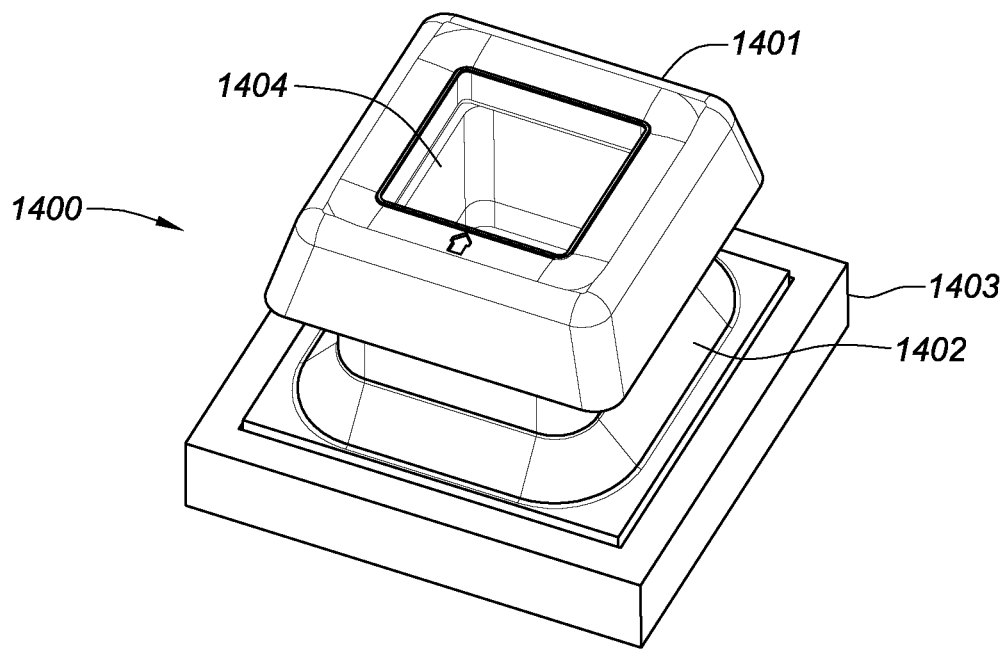
FIG. 14A is an isometric top view of a computer keyboard key, consistent with various embodiments of the present disclosure.
Figure 14B:
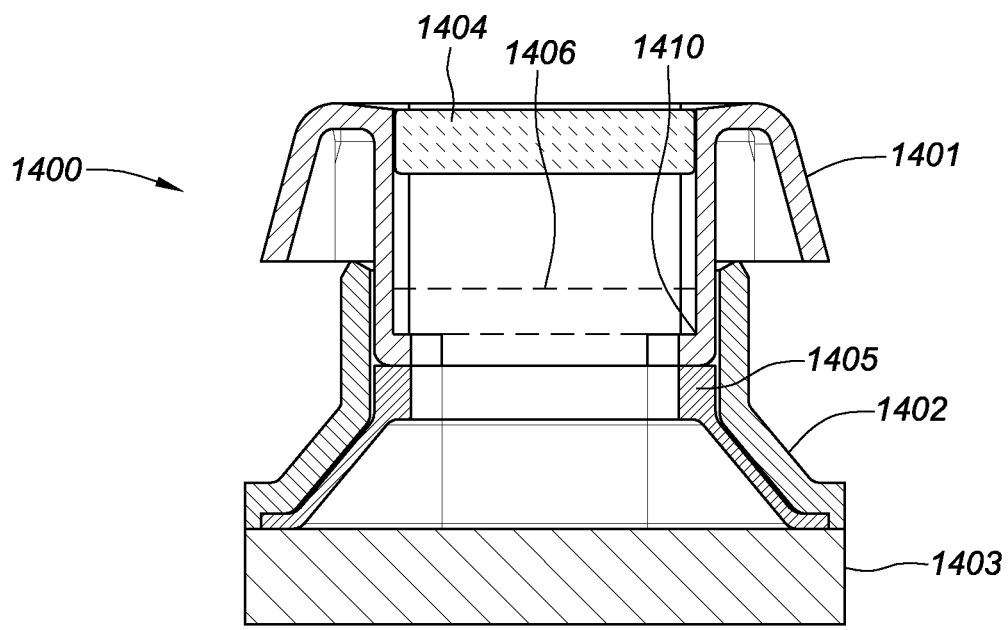
FIG. 14B is a cross-section side view of the computer keyboard key of FIG. 14A, consistent with various embodiments of the present disclosure.

FIG. 14A is an isometric top view of a computer keyboard key 1400 and FIG. 14B is a cross-sectional side view of the computer keyboard key 1400. The key 1400 is positioned on the top of an image projecting means and key matrix 1403 (or as shown in the present embodiment, a liquid crystal display with integrated touch screen). The key 1400 includes a body 1402 that in some embodiments facilitates a snap-fit during assembly with key cap 1401. A silicone rubber button 1405 (also referred to a membrane herein) is positioned within the body 1402. In response to depression of the key cap 1401 by a user, the silicone rubber button 1405 is deformed, simultaneously electrically coupling two contacts within the key matrix and providing tactile feedback to the user. As the force of the user's key depression ebbs, the deformation of the silicone rubber button 1405 provides a counter-acting force on the keycap 1401 returning the keycap to its static position and decoupling the two contacts of the key matrix.

In some alternative embodiments, the silicone rubber button 1405 may be replaced with a spiral compression spring, or the depression mechanism may consist of a scissor-mechanism and spring.

As shown in FIG. 14B, a longitudinal opening extends through the body 1402, key cap 1401 and silicone rubber button 1405 to facilitate light to travel through the opening onto a transparent cover 1404 of the key cap 1401. The transparent cover 1404 may be positioned flush with a top surface of keycap 1401, the image appearing thereon. In some embodiments, the cover may be 8×8 millimeters.

In some more specific embodiments, a lens 1406 may be positioned within the keycap 1401 on a ledge 1410 that facilitates positive positioning during assembly.

Various modules or other circuits may be implemented to carry out one or more of the operations and activities described herein and/or shown in the figures. In these contexts, a "module" is a circuit that carries out one or more of these or related operations/activities (e.g., keyboard circuitry, controller circuitry). For example, in certain of the above-discussed embodiments, one or more modules are discrete logic circuits or programmable logic circuits configured and arranged for implementing these operations/activities. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A peripheral electronic keyboard to detect user inputs, the electronic keyboard comprising:
   an electro-mechanical interface including
      a plurality of keys, each of the keys including a keycap, configured and arranged to receive a first user input on a first keycap of said plurality of keys, and
      a key matrix coupled to each key of said plurality of keys, and in response to the first user input is configured and arranged to convert the first user input into an electrical signal indicative of a first data input; and an image projecting means including a display configured and arranged to project an image, and one or more optical elements configured and arranged to focus the projected image from the display on to respective optically transparent portions of the keycaps;

wherein the one or more keys further include a hollow shaft configured and arranged to facilitate the projection of images from the image projecting means to the keycap, and the one or more optical elements are positioned within the hollow shaft of the one or more keys;

wherein the one or more optical elements include an aspheric lens with a top lens surface with a 1.7 millimeter diameter aperture, the image generated by the image projecting means is approximately 4 millimeters×4 millimeters, the projected image on the keycap is approximately 8 millimeters×8 millimeters, and the spot size of the projected image on the keycap is approximately 150 micrometers.

2. The electronic keyboard of claim 1, further including an aperture that has a focal ratio of approximately F/5.

3. The electronic keyboard of claim 1, wherein an outer surface of the optically transparent keycap has light diffusing properties.

4. The electronic keyboard of claim 1, further including a light diffusing plastic film on an outer surface of the optically transparent keycap.

5. The electronic keyboard of claim 1, wherein the image projecting means is coupled opposite the plurality of keys relative to the key matrix.

6. The electronic keyboard of claim 1, wherein the electronic keyboard further includes a housing that encompasses the image projecting means, and at least partially encompasses the electro-mechanical interface; and the electro-mechanical interface further includes a membrane coupled between the key and the one or more keys, the membrane configured and arranged to complete an electrical circuit of the key matrix, and return the one or more keys to an initial position after responding to the user input.

7. The electronic keyboard of claim 6, wherein the key matrix is substantially optically transparent, and the image projecting means is coupled to the key matrix opposite the keys, and is further configured and arranged to project the image to the keycap of the one or more keys via the substantially optically transparent key matrix.

8. The electronic keyboard of claim 6, wherein the projected image is not transmitted directly through the membrane.

9. The electronic keyboard of claim 1, wherein the electronic keyboard is not a mechanical overlay to a tablet computer screen.

10. A electronic keyboard comprising:
one or more keys, each key including a keycap and a hollow shaft extending to the keycap, the keys configured and arranged to detect user inputs;
one or more optical elements within the hollow shafts; and
an image projecting means configured and arranged to project an image through the hollow shaft and the one or more optical elements and onto the keycaps of the one or more keys;
an aperture, axially aligned with the image projecting means within the hollow shaft, with a focal ratio of approximately f/5; and
wherein the one or more optical elements are configured and arranged to focus the projected image on to the keycaps via an aspheric lens with a top lens surface with a 1.7 millimeter diameter aperture and the spot size of the projected image on the keycap is approximately 150 micrometers.

11. The electronic keyboard of claim 10, wherein the image generated by the image projecting means is approximately 4 millimeters×4 millimeters, the projected image on the keycap is approximately 8 millimeters×8 millimeters.

\* \* \* \* \*